(12) United States Patent
Takahashi

(10) Patent No.: US 7,250,737 B2
(45) Date of Patent: Jul. 31, 2007

(54) MOTOR CONTROL APPARATUS

(75) Inventor: Tomohiro Takahashi, Toyota (JP)

(73) Assignee: OMRON Corporation, Kyoto-shi, Kyoto (JP)

( * ) Notice: Subject to any disclaimer, the term of this patent is extended or adjusted under 35 U.S.C. 154(b) by 0 days.

(21) Appl. No.: 11/387,144

(22) Filed: Mar. 22, 2006

(65) Prior Publication Data

US 2007/0046226 A1 Mar. 1, 2007

(30) Foreign Application Priority Data

Aug. 23, 2005 (JP) ............... 2005-241831

(51) Int. Cl.
*E05F 15/16* (2006.01)

(52) U.S. Cl. ............... 318/434; 318/286; 318/469; 49/28

(58) Field of Classification Search ........ 318/264–266, 318/283–286, 434, 466–469; 49/26, 28; 701/49

See application file for complete search history.

(56) References Cited

U.S. PATENT DOCUMENTS

| | | | | | |
|---|---|---|---|---|---|
| 4,585,981 | A | * | 4/1986 | Zintler | 318/615 |
| 5,530,329 | A | * | 6/1996 | Shigematsu et al. | 318/469 |
| 5,585,705 | A | * | 12/1996 | Brieden | 318/467 |
| 6,070,116 | A | * | 5/2000 | Pruessel et al. | 701/49 |
| 6,100,658 | A | * | 8/2000 | Kume et al. | 318/286 |
| 6,183,040 | B1 | | 2/2001 | Imaizumi et al. | |
| 6,274,947 | B1 | * | 8/2001 | Terashima | 307/10.1 |
| 6,825,623 | B2 | * | 11/2004 | Onozawa et al. | 318/257 |
| 6,933,694 | B2 | * | 8/2005 | Caussat | 318/461 |
| 6,943,515 | B2 | * | 9/2005 | Kidokoro | 318/466 |
| 7,170,244 | B2 | * | 1/2007 | Choby | 318/280 |

FOREIGN PATENT DOCUMENTS

| | | |
|---|---|---|
| JP | 7-212963 | 8/1995 |
| JP | 3657671 | 3/2005 |

* cited by examiner

*Primary Examiner*—Bentsu Ro
(74) *Attorney, Agent, or Firm*—Osha-Liang LLP

(57) ABSTRACT

A motor control apparatus includes a detection device for detecting a rotation speed of a motor, a storing section for successively storing the rotation speed detected by the detection device, a calculation device for calculating a variation amount of the rotation speed from current rotation speed which is output from the detection device and from past rotation speed stored in the storing section, a determining device for determining whether there is rotation abnormality of the motor based on a result of comparison between the variation amount calculated by the calculation device and a preset threshold value, and a control device for controlling the motor in accordance with a result of determination of the determining device. The calculation device calculates the variation amount from a sum of the current rotation speed and a rotation speed detected before predetermined times thereof, and a sum of the past rotation speed and a rotation speed detected before predetermined times thereof.

7 Claims, 20 Drawing Sheets

MOTOR CONTROL APPARATUS

BACKGROUND OF THE INVENTION

1. Field of the Invention

The present invention relates to a motor control apparatus which controls a motor for driving an opening/closing body of a vehicle.

2. Description of the Relates Art

An automobile is provided with an opening/closing body such as a window of a door, a sunroof, a slide door and the like, a motor for driving the opening/closing body, and a motor control apparatus for controlling the motor. Of motor control apparatuses, one which controls a motor for opening and closing a window is called a power window apparatus (or window open/close control apparatus). Generally, the power window apparatus normally or reversely rotate the motor by switching operation, thereby vertically moving a window glass of a door and opening or closing the window.

FIG. 1 shows a block diagram showing an electrical structure of the power window apparatus. A reference numeral 1 represents an operation switch for opening and closing a window, a reference numeral 2 represents a motor drive circuit for driving a motor 3, a reference numeral 4 represents a rotary encoder for outputting pulse which is synchronous with rotation of the motor 3, a reference numeral 5 represents a pulse detection circuit for detecting pulse output from the rotary encoder 4, a reference numeral 6 represents a memory comprising a ROM or a RAM, and a reference numeral 8 represents a control unit comprising a memory and a CPU which controls the opening and closing operation of the window.

If the operation switch 1 is operated, a window opening/closing command is given to the control unit 8, and the motor 3 is normally or reversely rotated by the motor drive circuit 2. If the motor 3 is rotated, a window open/close mechanism which is associated with the motor 3 is operated, and the window is opened or closed. The pulse detection circuit 5 detects pulse output from the rotary encoder 4, the control unit 8 calculates an opening/closing amount of the window and the motor speed based on a result of the detection, and controls the rotation of the motor 3 through the motor drive circuit 2.

FIG. 2 is a schematic diagram showing a structure of one example of the operation switch 1. The operation switch 1 includes an operation knob 11 which can be rotated in a direction ab around an axis Q, a rod 12 which is integrally provided on the operation knob 11, and a known slide switch 13. A reference numeral 14 represents an actuator of the slide switch 13, and a reference numeral 20 represents a cover of a switch unit into which the operation switch 1 is incorporated. A lower end of the rod 12 is engaged with the actuator 14 of the slide switch 13. If the operation knob 11 rotates in the direction ab, the actuator 14 moves in the direction cd through the rod 12, and a contact (not shown) of the slide switch 13 is switched in accordance with the position of the actuator 14.

The operation knob 11 can be switched to positions of automatic close AC, manual close MC, neutral N, manual open MO and automatic open AO. FIG. 2 shows that the operation knob 11 is in the neutral N position. From this position, if the operation knob 11 is rotated by a given amount in the direction a and brought into the manual close MC position, the manual closing action for manually closing the window is carried out, and if the operation knob 11 is further rotated in the direction a to the automatic close AC position, the automatic closing action for automatically closing the window is carried out. If the operation knob 11 is rotated from the neutral N position in the direction b by a given amount and is brought into the manual open MO position, manual opening action for manually opening the window is carried out, and if the operation knob 11 is further rotated from this position in the direction b and is brought into the automatic open AO position, automatic opening action for automatically opening the window is carried out. The operation knob 11 is provided with a spring (not shown), and if a user releases his or her hand from the operation knob 11 which was rotated, the operation knob 11 is returned to the neutral N position by the spring force.

In the case of the manual action, the opening or closing action of the window is carried out for time during which the operation knob 11 is manually held at the manual close MC position or the manual open MO position, and if the user release the hand from the operation knob 11 and the knob is returned to the neutral N position, the closing or opening action of the window is stopped. In the case of the automatic action, if the operation knob 11 is once rotated to the automatic close AC position or the automatic open AO position, even if the user release his or her hand from the operation knob 11 and the knob returns to the neutral N position thereafter, the closing action or opening action of the window is continuously carried out.

FIG. 3 shows one example of the window open/close mechanism provided in each window of a vehicle. A reference numeral 100 represents the window, a reference numeral 101 represents a window glass 101 which closes and opens the window 100, and a reference numeral 102 represents a window open/close mechanism 102. The window glass 101 carries out vertical action by operation of the window open/close mechanism 102, and if the window glass 101 moves upward, the window 100 is closed, and if the window glass 101 moves downward, the window 100 is opened. In the window open/close mechanism 102, a reference numeral 103 represents a support member mounted on a lower end of the window glass 101. A reference numeral 104 represents a first arm having one end engaged with the support member 103 and the other end rotatably supported by a bracket 106. A reference numeral 105 represents a second arm having one end engaged with the support member 103 and the other end engaged with the guide member 107. Intermediate portions of the first arm 104 and the second arm 105 are connected to each other through a shaft. A reference numeral 3 represents the motor and a reference numeral 4 represents the rotary encoder. The rotary encoder 4 is connected to a rotation shaft of the motor 3, and outputs a number of pulses which is proportional to the rotation amount of the motor 3. By counting the number of pulses output from the rotary encoder 4 within a predetermined time, the rotation speed of the motor 3 can be detected. The rotation amount of the motor 3 (moving amount of the window glass 101) can be calculated from the output of the rotary encoder 4.

A reference numeral 109 represents a pinion 109 which is rotated by the motor 3. A reference numeral 110 is a fan-like gear which meshes with the pinion 109 and rotates. The gear 110 is fixed to the first arm 104. The motor 3 can rotate both normally and reversely. By normal and reverse rotation, the pinion 109 and the gear 110 are rotated, and the first arm 104 is turned in the normal and reverse directions. With this, the other end of the second arm 105 slides laterally along a groove of the guide member 107, the support member 103 vertically moves to vertically move the window glass 101, thereby opening and closing the window 100.

In the power window apparatus, when the operation knob 11 is in the automatic close AC position in FIG. 2 and the automatic closing action is carried out, the power window apparatus has a function to detect that a substance is caught in the window. That is, as shown in FIG. 4, when a substance Z is caught in a gap of the window glass 101 during the closing process of the window 100, this situation is detected, and the closing action of the window 100 is stopped or is shifted to the opening action. Since the window 100 is automatically closed during the automatic closing action, if a hand or a neck is erroneously sandwiched, it is necessary to prohibit the closing action to prevent a person from being injured and thus, such a sandwich detecting function is provided. For detecting such sandwiched state, the control unit 8 always read the rotation speed of the motor 3 which is the output of the pulse detection circuit 5, compares the current rotation speed and the past rotation speed, detects whether there is rotation abnormality of the motor 3 based on a result of the comparison, and determines whether a substance is caught from the detection result. If a substance Z is caught in the window 100, load acting on the motor 3 is increased and the rotation speed is lowered abnormally. Therefore, the variation amount of the speed is increased and when the variation amount of the speed exceeds the threshold value, it is determined that the substance Z is caught. The threshold value is previously stored in the memory 6.

The variation in rotation speed of the motor 3 is generated not only when a substance is caught in the window but also due to vibration generated when a door is closed or when the vehicle runs on a bad road. If the rotation speed is varied due to such vibration, even when a substance is not caught in the window, it may erroneously be determined that the substance is caught and the window may be opened in some cases.

To prevent such a situation, in Japanese Patent Application Laid-Open No. 2000-160931 (paragraph 0055, FIG. 10 and the like), an average value of rotation speeds of the motor is calculated, a difference between the average value and the current rotation speed is calculated, and it is determined whether a substance is caught in the window from a result of comparison between the difference and a predetermined threshold value. In Japanese Patent No. 3657671 (paragraphs 0032 to 0035, FIG. 5 and the like), a difference between a first moving average value of pulse signal cycles including cycles of first pulse signal and a second moving average value of pulse signal cycles including past pulse signal cycles which are older than pulse signal cycles of at least the first moving average value of pulse signals which are synchronous with rotation of the motor is calculated as a motor load, and a rotation abnormality (excessive load) of the motor is determined from a result of comparison of the motor load and a predetermined threshold value. In Japanese Patent Application Laid-Open No. H7-212963 (paragraphs 0023, 0024 and FIG. 3 and the like), an average value from speed data showing latest rotation speed of the motor to speed data which is older by the A-number is determined as a current speed, speed data which is older than the latest speed data by the N-number is determined as a starting point, and an average value of speed data from the speed data which is older by the N-number to speed data which is older by B-number is defined as an older speed. When the current speed is smaller than the older speed and a difference therebetween is greater than a predetermined threshold value, it is determined that rotation abnormality is generated in the motor.

According to the above-described power window apparatuses, acceleration and deceleration of rotation speed of the motor 3 may be repeated due to mechanical factor such as deviation of a center shaft of the pinion 109, and the rotation speed may be vertically largely pulsated (swung). In this case, since pulses are included in the output signal (pulse signal) from the rotary encoder 4, even though rotation abnormality of the motor 3 caused by a substance Z caught in the window is not generated, it may be erroneously determined that the rotation abnormality is generated in some cases.

Hence, it is an object of the present invention to provide a motor control apparatus capable of detecting rotation abnormality of a motor without receiving influence of pulse of a rotation speed of a motor.

SUMMARY OF THE INVENTION

To achieve the above object, a first invention provides a motor control apparatus comprising detection means for detecting a rotation speed of a motor, storing means for successively storing the rotation speed detected by the detection means, calculation means for calculating a variation amount of the rotation speed from current rotation speed which is output from the detection means and from past rotation speed stored in the storing means, determining means for determining whether there is rotation abnormality of the motor based on a result of comparison between the variation amount calculated by the calculation means and a preset threshold value, and control means for controlling the motor in accordance with a result of determination of the determining means, wherein the calculation means calculates the variation amount from a sum of the current rotation speed and a rotation speed detected before predetermined times thereof, and a sum of the past rotation speed and a rotation speed detected before predetermined times thereof.

If the difference between the sum of the two rotation speeds including the current rotation speed and the sum of the past two rotation speeds is calculated and defined as a variation amount of the rotation speed of the motor, even if the rotation speed of the motor is pulsed due to mechanical factor, it is possible to suppress a degree of the pulse for the variation amount to a small level. Therefore, if it is determined whether there is rotation abnormality of the motor based on the result of comparison between the variation amount and the threshold value, it is possible to detect the rotation abnormality of the motor without receiving influence of pulse of the rotation speed of the motor.

A second invention provides a motor control apparatus comprising detection means for detecting a rotation speed of a motor, first storing means for successively storing the rotation speed detected by the detection means, filtering means for removing a disturbance from a current rotation speed output from the detection means and from a past rotation speed stored in the first storing means, second storing means for storing the rotation speed subjected to filtering processing and output from the filtering means, calculation means for calculating a variation amount of a rotation speed from the rotation speed subjected to the current filtering processing output from the filtering means and from a rotation speed subjected to the past filtering processing stored in the second storing means, determining means for determining whether there is rotation abnormality of the motor based on a result of comparison between a variation amount calculated by the calculation means and a preset threshold value, and control means for controlling the motor in accordance with a result of the determination of the determining means, wherein the filtering means calculates and outputs an average value between the current rotation speed and a rotation speed detected before predetermined times thereof, as a rotation speed after the filtering processing.

The average value of the two rotation speeds including the current rotation speed is calculated as the rotation speed after the filtering processing, and the difference between the rotation speeds after current and past filtering processing is calculated as the variation amount of the rotation speed of the motor. With this, it is possible to suppress a degree of the pulse for the variation amount to a small level. Therefore, it is possible to detect the rotation abnormality of the motor without receiving influence of pulse of the rotation speed of the motor based on the result of comparison between the variation amount and the threshold value.

A third invention provides a motor control apparatus comprising detection means for detecting a rotation speed of a motor, first storing means for successively storing the rotation speed detected by the detection means, filtering means for removing a disturbance from a current rotation speed output from the detection means and from a past rotation speed stored in the first storing means, second storing means for storing the rotation speed subjected to filtering processing and output from the filtering means, calculation means for calculating a variation amount of a rotation speed from the rotation speed subjected to the current filtering processing output from the filtering means and from a rotation speed subjected to the past filtering processing stored in the second storing means, determining means for determining whether there is rotation abnormality of the motor based on a result of comparison between a variation amount calculated by the calculation means and a preset threshold value, and control means for controlling the motor in accordance with a result of the determination of the determining means, wherein the filtering means subtracts an average value of rotation speeds from a sum of the current rotation speed and a rotation speed detected before predetermined times thereof, and outputs the same as a rotation speed after the filtering processing.

The average value of the rotation speeds is subtracted from the sum of the two rotation speeds including the current rotation speed, and a result thereof is determined as a rotation speed after the filtering processing. With this, it is possible to further reduce the degree of pulse of the variation amount of the rotation speed of the motor which is a difference of the rotation speeds after current and past filtering processing. Thus, it is possible to detect the rotation abnormality of the motor from the result of comparison between the variation amount and the threshold value without receiving influence of pulse of the rotation speed of the motor.

According to a fourth invention, in the third invention, the filtering means calculates the average value from the past rotation speed which does not includes the current rotation speed.

If the average value of the rotation speeds is calculated without using the current rotation speed, the average value is subtracted from the sum of the two rotation speeds including the current rotation speed when the rotation abnormality of the motor is generated and a result is defined as the rotation speed after the filtering processing, and the difference between the rotation speeds after the current and past filtering processing is defined as the variation amount of the rotation speed of the motor. With this, it is possible to suppress only pulse caused by mechanical factor without suppressing variation in rotation speed caused by rotation abnormality included in the variation amount.

According to a fifth invention, in any of the second to fourth inventions, the filtering means once or more carries out processing for calculating and outputting a rotation speed after two or more filtering processing from a rotation speed after current filtering processing and from a rotation speed after past filtering processing stored in the second storing means after a rotation speed after the filtering processing is calculated, the calculation means calculates a variation amount of a rotation speed from a rotation speed after one or more current filtering processing which was finally calculated by the filtering means and from a rotation speed after two or more past filtering processing stored in the second storing means. Here, "after one or more filtering processing" means that "filtering processing is carried out twice or more". Further, "after filter n-times" means that "after filtering processing is carried out n-times".

If the rotation speed after new one or more filtering processing is calculated and output from a rotation speed after calculated filtering processing, it is possible to remove disturbance from the rotation speed of the motor obtained by the detection means over the plurality of times. Thus, if the variation amount of the rotation speed of the motor is calculated from the rotation speed after new one or more filtering processing as in the above manner, it is possible to further reduce the degree of pulse of the variation amount.

According to the present invention, even if a rotation speed of a motor is pulsated due to mechanical factor, it is possible to suppress the degree of pulse of the variation amount of the rotation speed to a small level. Therefore, it is possible to detect the rotation abnormality of the motor without receiving influence of pulse of the rotation speed of the motor.

DETAILED DESCRIPTION OF THE PREFERRED EMBODIMENTS

Figure 1:
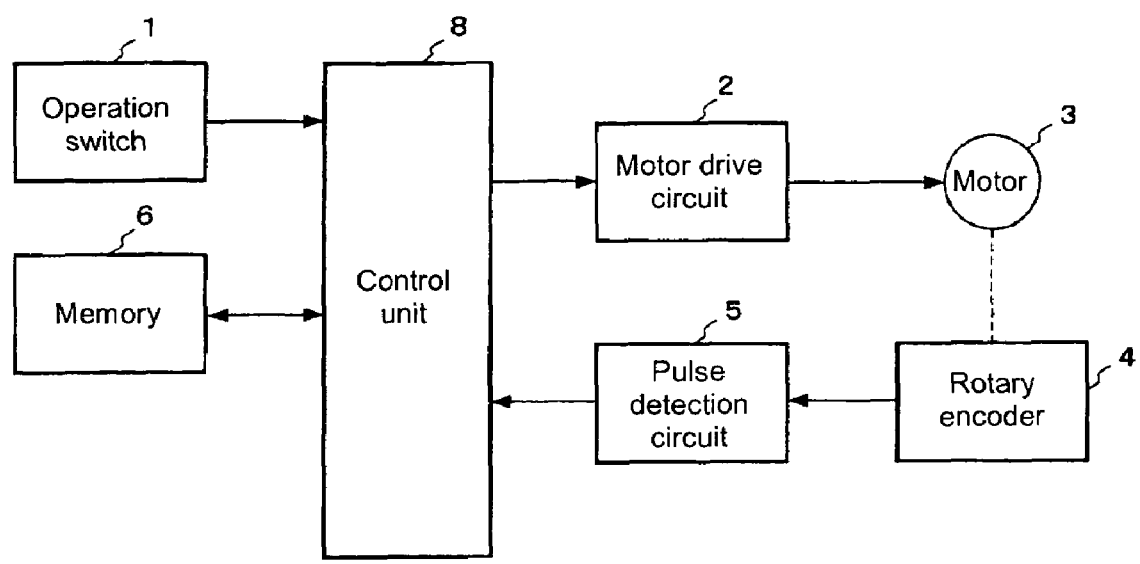
FIG. 1 shows a block diagram showing an electrical structure of a power window apparatus according to an embodiment of the present invention.
Figure 2:
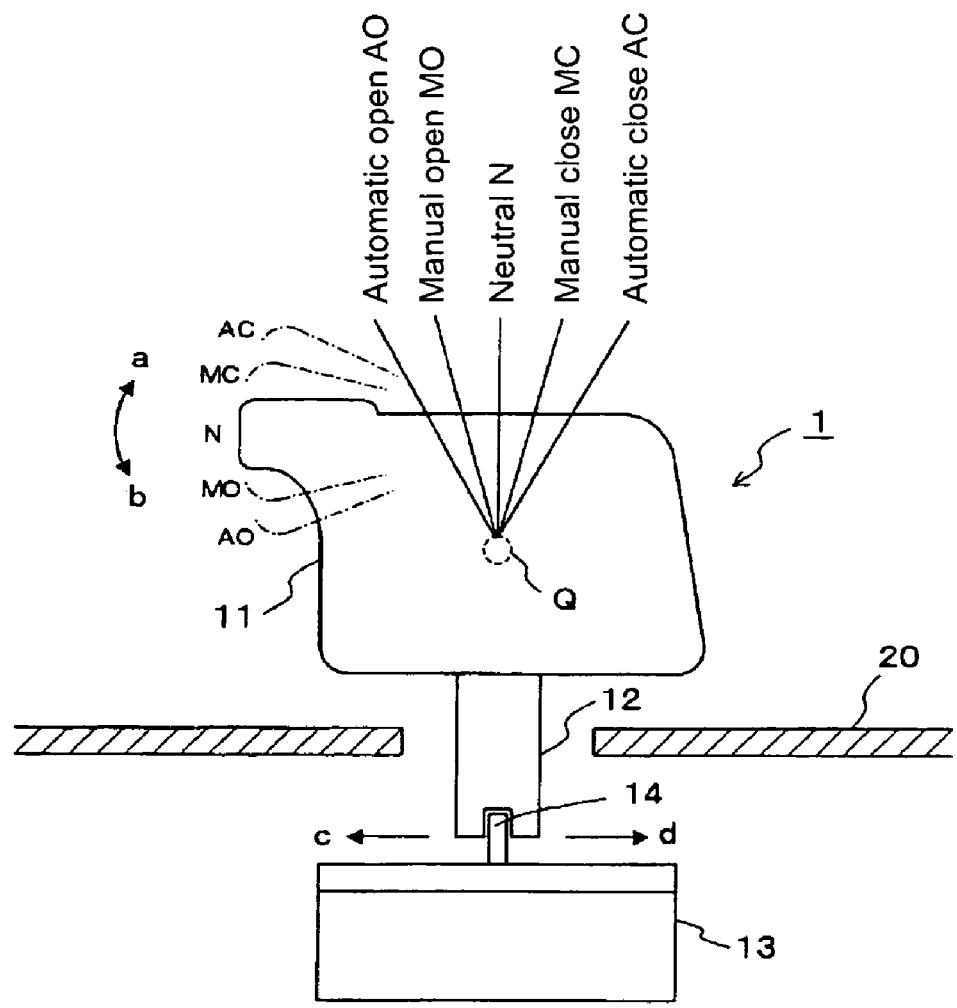
FIG. 2 shows a schematic diagram showing a structure of one example of an operation switch.
Figure 3:
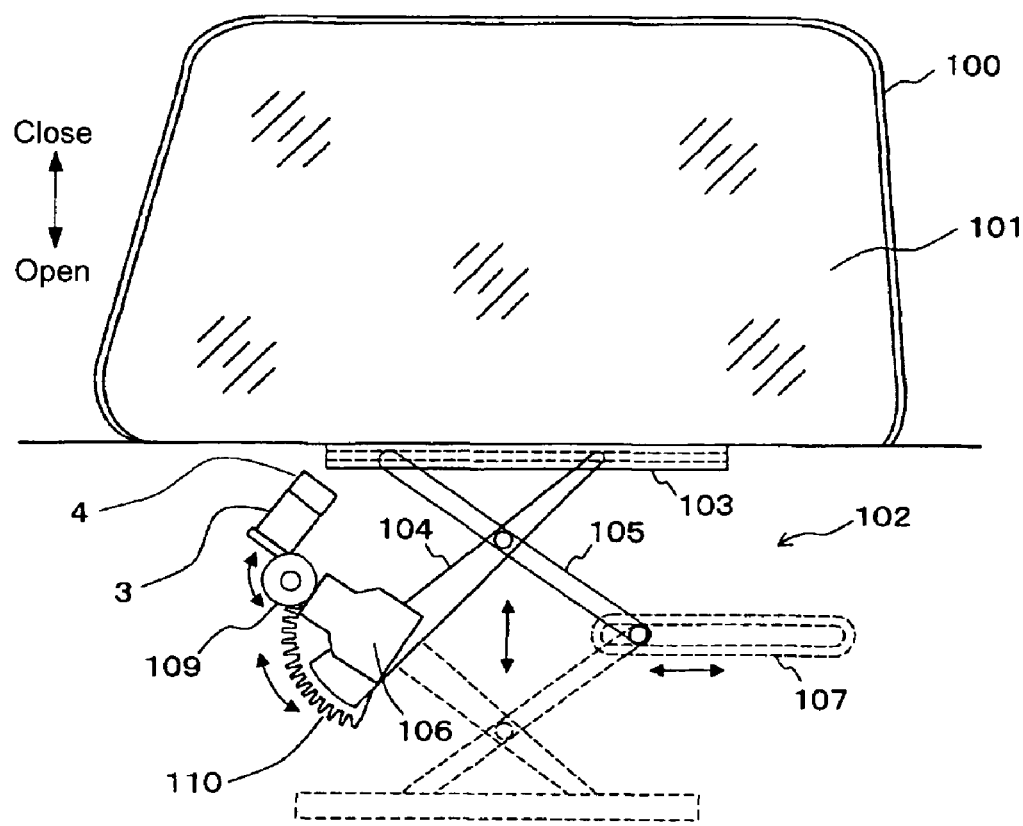
FIG. 3 shows a diagram showing one example of a window open/close mechanism.
Figure 4:
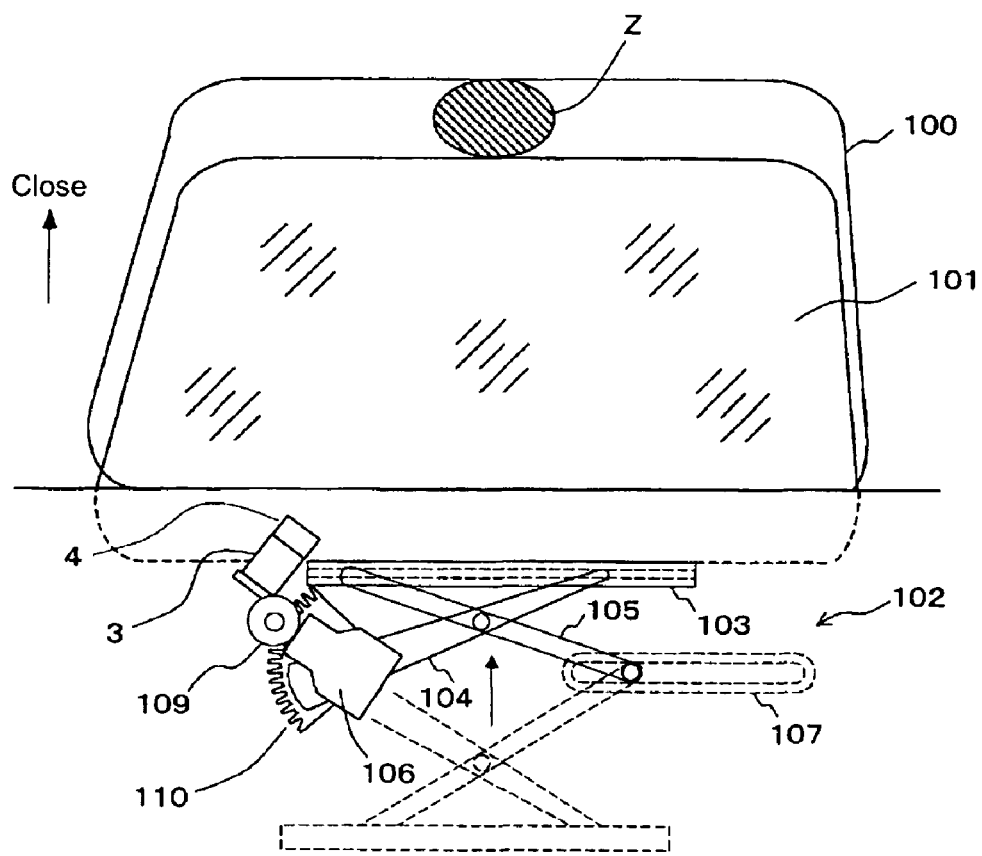
FIG. 4 shows a diagram showing a state where a substance is caught in a window.

Next, embodiments of the present invention will be explained with reference to the drawings. In the following description, FIGS. 1 to 4 used for explaining the paragraph of background technique are referred to as the embodiments of the invention. FIG. 1 is a block diagram showing an electrical structure of a power window apparatus which is an embodiment of the invention. The power window apparatus is an open/close control apparatus which controls opening and closing operations of a window of a vehicle. The power window apparatus constitutes a motor control apparatus of this invention. A control unit 8 constitutes control means of the invention. FIG. 2 is a schematic diagram showing a structure of one example of an operation switch. FIG. 3 is a diagram showing one example of the window open/close mechanism provided in each window of the vehicle. FIG. 4 is a diagram showing that a substance is caught in the window in FIG. 3. Since these drawings have already been explained, explanation thereof will not be repeated here.

Figure 5:
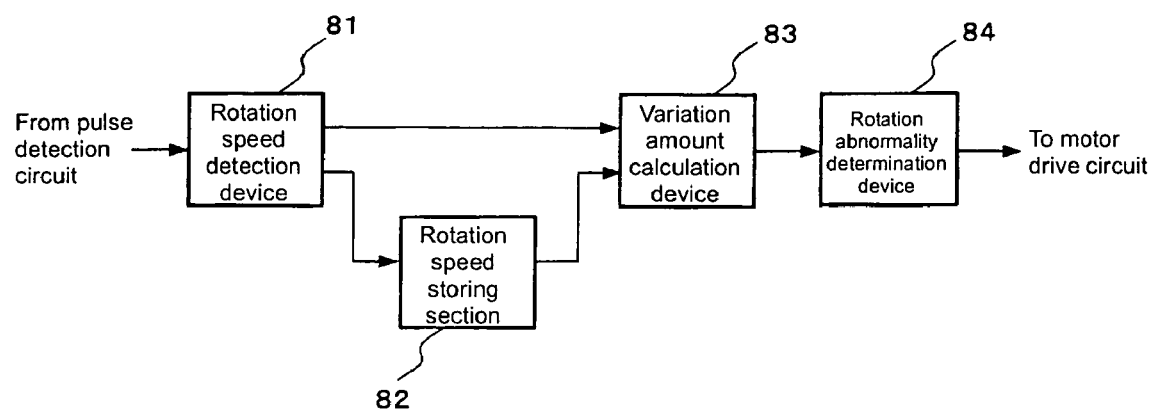
FIG. 5 shows a diagram showing rotation abnormality detection blocks in a first embodiment of the invention.

FIG. 5 shows the rotation abnormality detection blocks caused when the substance is caught in the window in a first embodiment of the invention. Of the rotation abnormality detection blocks, a rotation speed detection device 81, a variation amount calculation device 83 and a rotation abnormality determination device 84 belong to the control unit 8. These elements are illustrated as hardware circuits for the sake of convenience, but functions of the circuits are realized by software in the actual case. Of course, these elements may be constituted by hardware circuits. Although a rotation speed storing section 82 is provided in a predetermined region in a memory 6, the rotation speed storing section 82 may be provided in the control unit 8 as an independent memory.

In FIG. 5, the rotation speed detection device 81 detects a rotation speed of a motor 3 in a predetermined cycle by counting the number of cycle of pulses which are output from a pulse detection circuit 5 shown in FIG. 1. The rotation speed detection device 81 constitutes the detection means of the present invention together with a pulse detection circuit 5 and a rotary encoder 4 shown in FIG. 1. The rotation speed storing section 82 sequentially stores rotation speeds detected by the rotation speed detection device 81. That is, the rotation speed storing section 82 sequentially stores a plurality of rotation speeds detected in the predetermined cycle. The rotation speed storing section 82 constitutes storing means of the invention. The variation amount calculation device 83 calculates a variation amount of the rotation speed from a current rotation speed output from the rotation speed detection device 81 and from a past rotation speed stored in the rotation speed storing section 82. The variation amount calculation device 83 constitutes calculation means of the invention. The rotation abnormality determination device 84 determines whether there exists a rotation abnormality of the motor 3 generated when a substance Z is caught in a window 100 as shown in FIG. 4, based on a result of comparison between a variation amount of a rotation speed output from the variation amount calculation device 83 and a predetermined threshold value which is previously set and stored in the memory 6, and the rotation abnormality determination device 84 outputs a control signal corresponding to the result of determination to the motor drive circuit 2 shown in FIG. 1. The rotation abnormality determination device 84 constitutes determining means of the invention.

Figure 6:
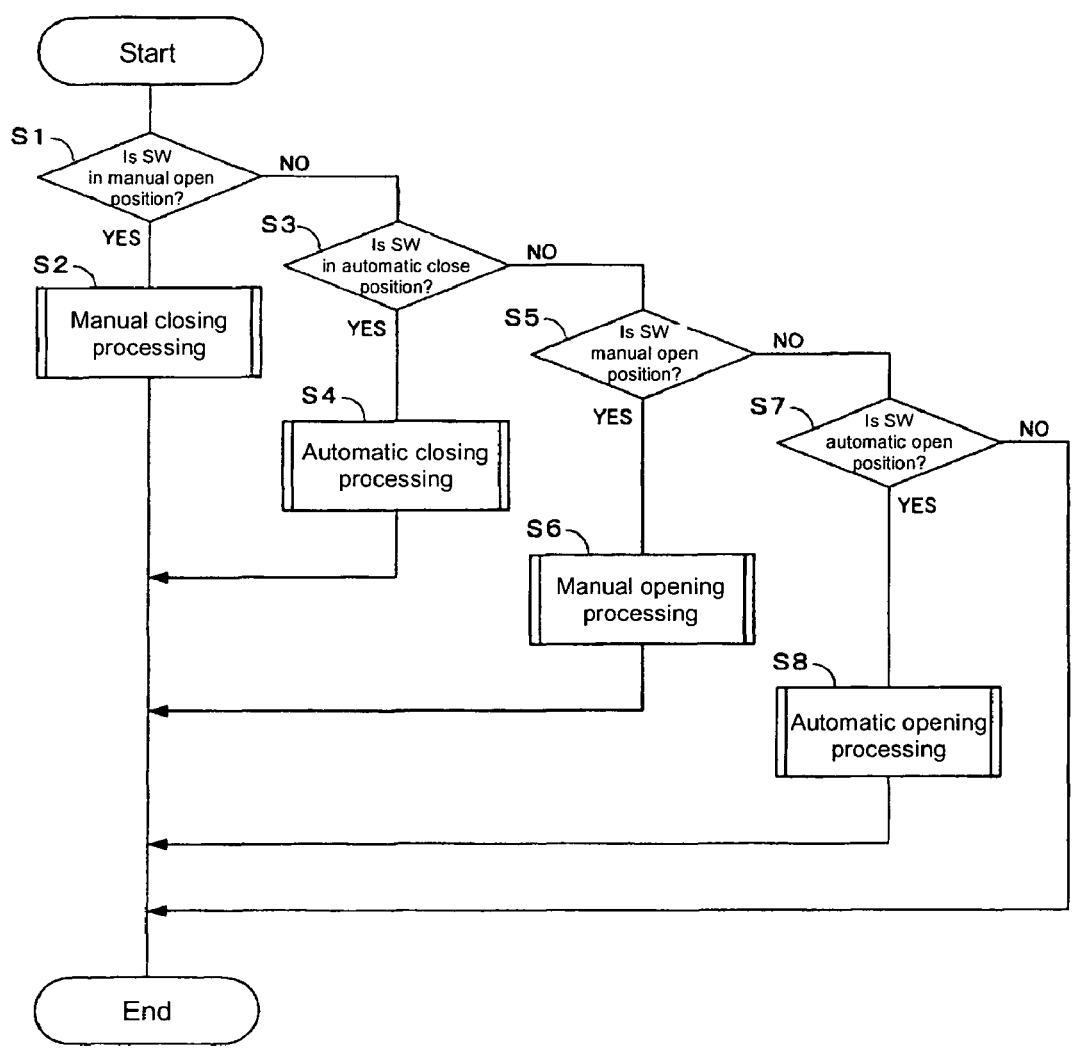
FIG. 6 shows a flowchart showing a basic operation of the power window apparatus.

FIG. 6 is a flowchart showing a basic operation of the power window apparatus. If the operation switch 1 in FIG. 2 is in a manual close MC position in step S1, processing of a manual closing action is carried out (step S2), if the operation switch 1 is in an automatic close AC position in step S3, processing of automatic closing action is carried out (step S4), if the operation switch 1 is in a manual open MO position in step S5, processing of manual opening action is carried out (step S6), if the operation switch 1 is in an automatic open AO position in step S7, processing of an automatic opening action is carried out (step S8). If the operation switch 1 is not in the automatic open AO position in step S7, the operation switch 1 is in a neutral N position, and no processing is carried out. Details of steps S2, S4, S6 and S8 will be explained below.

Figure 7:
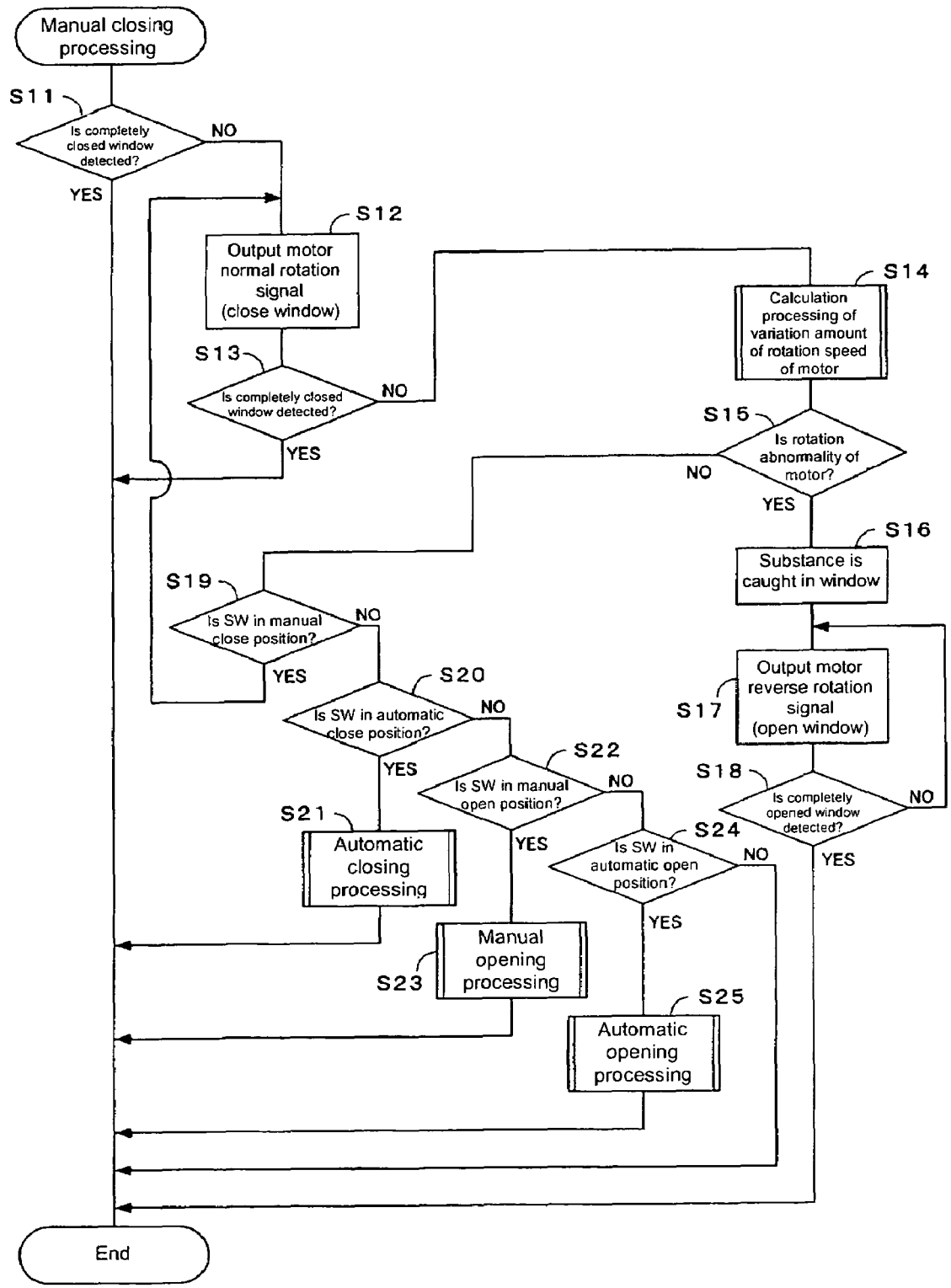
FIG. 7 shows a flowchart showing detailed procedure of a manual closing processing.
Figure 9:
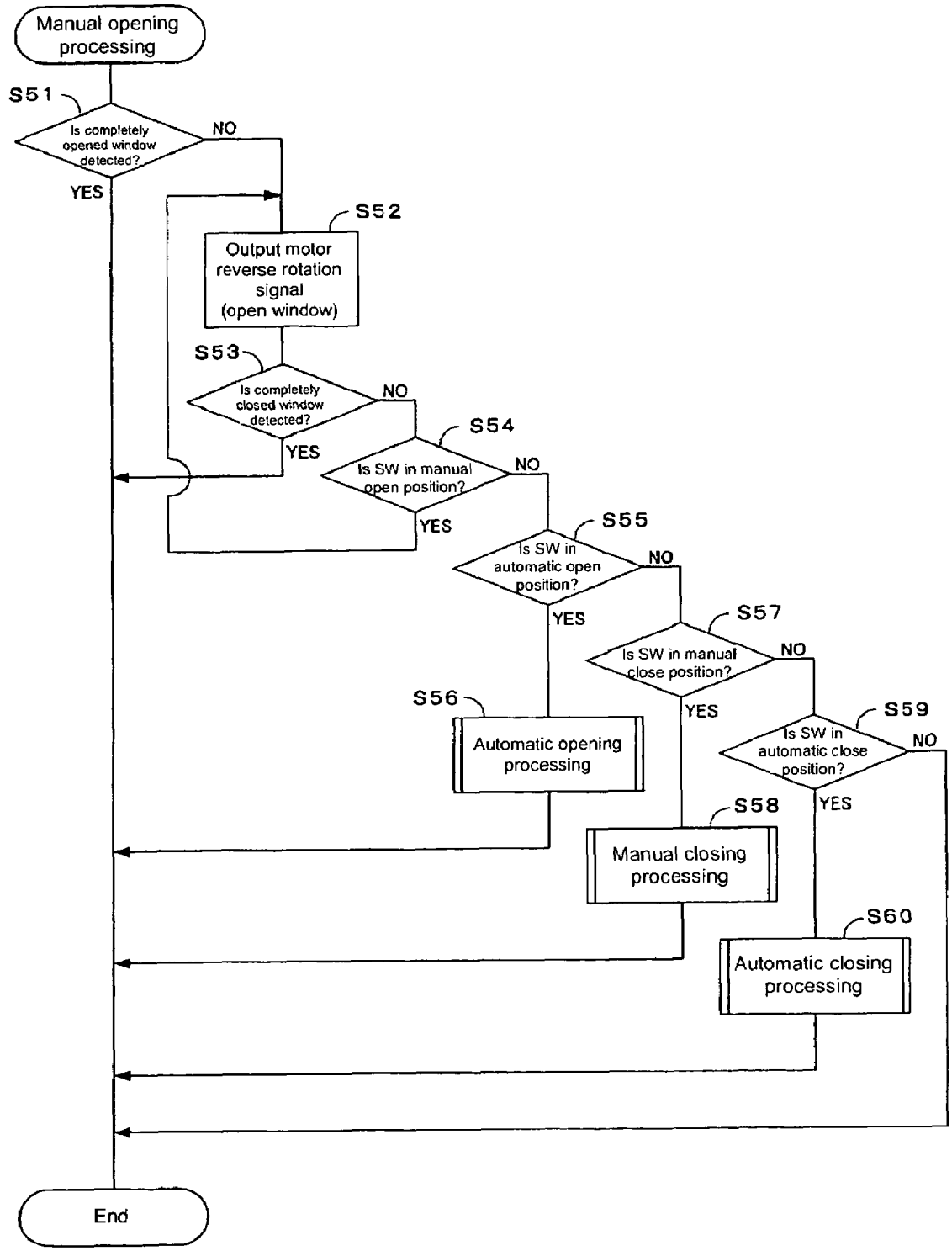
FIG. 9 shows a flowchart showing a detailed procedure of manual opening processing.
Figure 10:
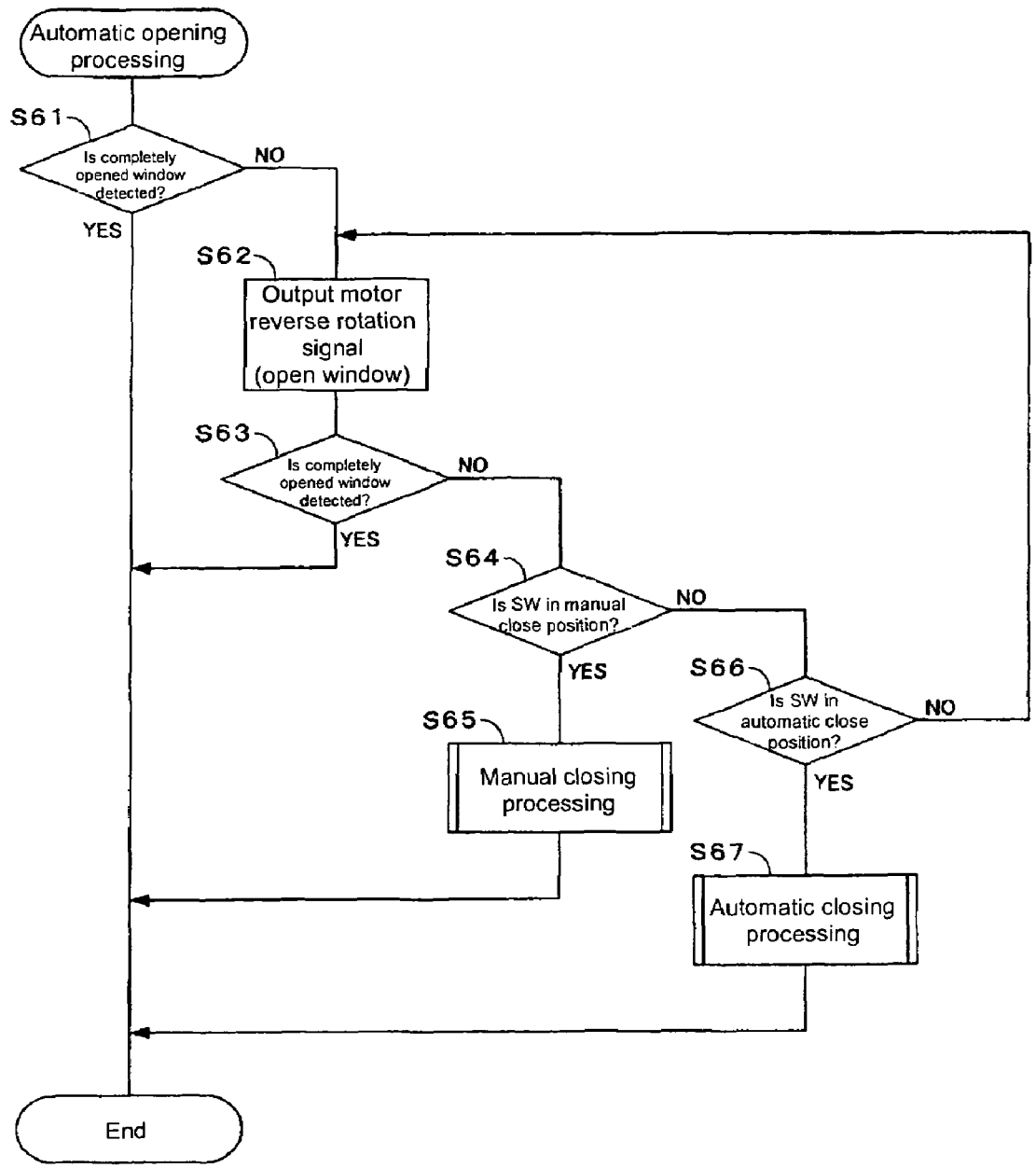
FIG. 10 shows a flowchart showing a detailed procedure of automatic opening processing.

FIG. 7 is a flowchart showing detailed procedure of a manual closing processing in step S58 in FIG. 9 and step S65 in FIG. 10. The procedure is carried out by a CPU constituting the control unit 8, and the same is also applied to the later-described flowcharts. First, it is determined whether the window 100 is completely closed by the manual closing processing based on output of the rotary encoder 4 (step S11). If the window 100 completely closed (step S11: YES), the processing is completed, and if the window 100 is not completely closed (step S11: NO), a normal rotation signal is output from the motor drive circuit 2 to normally rotate the motor 3, and the window 100 is closed (step S12). Then, it is determined whether the window 100 is completely closed (step S13). If the window 100 is completely closed (step S13: YES), the processing is completed, and if the window 100 is not completely closed (step S13: NO), calculation processing of a variation amount of a rotation speed of the motor 3 is carried out (step S14) based on the current rotation speed of the motor 3 and the past rotation speed stored in the rotation speed storing section 82 (step S14). Details of this calculation processing will be described later.

If the variation amount of the rotation speed of the motor 3 is calculated in step S14, it is determined whether there is rotation abnormality of the motor 3 caused by a substance Z which is caught in the window based on a result of comparison between the variation amount and a predetermined threshold value stored in the rotation speed storing section 82 (step S15). Here, if the substance Z is caught in the window 100 as shown in FIG. 4 and the variation amount of the rotation speed of the motor 3 exceeds the threshold value, it is determined that there is the rotation abnormality of the motor 3 (step S15: YES), and it is determined that a foreign substance is caught in the window 100 (step S16). Then, a reverse rotation signal is output from the motor drive circuit 2 to reversely rotate the motor 3, and the window 100 is opened (step S17). With this, the substance is released. Then, it is determined whether the window 100 is completely opened (step S18), and if the window 100 is completely opened (step S18: YES), the processing is completed, and if the window 100 is not completely opened (step S18: NO), the procedure is returned to step S17, and the reverse rotation of the motor 3 is continued.

If the substance Z is not caught in the window 100 in step S15 and the variation amount of the rotation speed of the motor 3 does not exceeds the threshold value, it is determined that there is NO rotation abnormality of the motor 3 (step S15: NO). Subsequently, it is determined whether the operation switch 1 is in the manual close MC position (step S19). If the operation switch 1 is in the manual close MC position (step S19: YES), the procedure is returned to step S12, and normal rotation of the motor 3 is continued. If the operation switch 1 is not in the manual close MC position (step S19: NO), it is determined whether the operation switch 1 is in the automatic close AC position (step S20). If the operation switch 1 is in the automatic close AC position (step S20: YES), the procedure is shifted to the later-described automatic closing processing step S21), and if the operation switch 1 is not in the automatic close AC position (step S20: NO), it is determined whether the operation switch 1 is in the manual open MO position (step S22). If the operation switch 1 is in the manual open MO position (step S22: YES), the procedure is shifted to the later-described manual opening processing (step S23), and if the operation switch 1 is not in the manual open MO position (step S22: NO), it is determined whether the operation switch 1 is in the automatic open AO position (step S24). If the operation switch 1 is in the automatic open AO position (step S24: YES), the procedure is shifted to the later-described automatic opening processing (step S25), and if the operation switch 1 is not in the automatic open AO position (step S24: NO), no processing is carried out and the procedure is completed.

Figure 8:
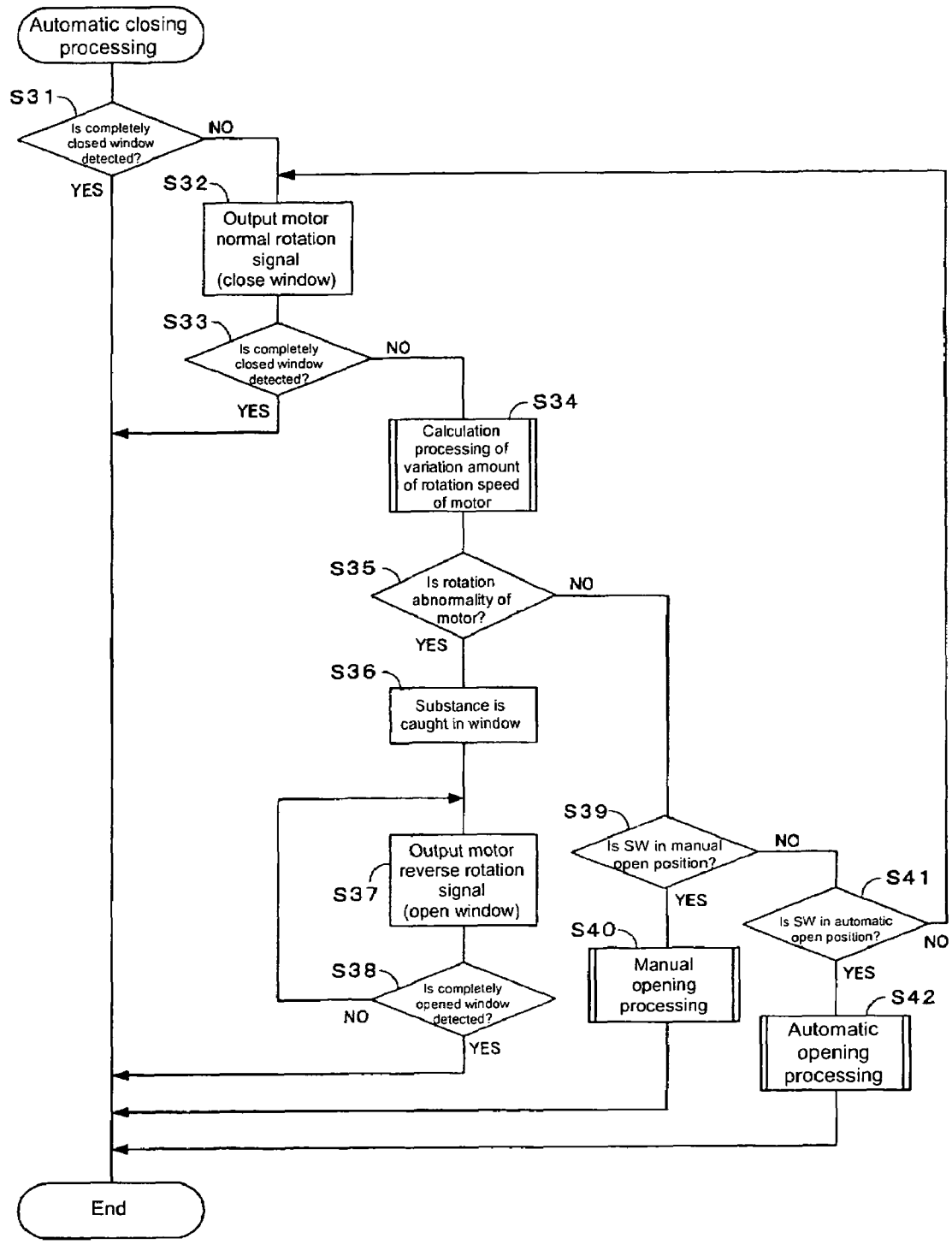
FIG. 8 shows a flowchart showing a detailed procedure of automatic closing processing.

FIG. 8 is a flowchart showing detailed procedure of the automatic closing action in step S4 in FIG. 6, step S21 in FIG. 7, step S60 in FIG. 9 and step S67 in FIG. 10. First, it is determined whether the window 100 is completely closed by the automatic closing action based on the output of the rotary encoder 4 (step S31). If the window 100 is completely closed (step S31: YES), the processing is completed, and if the window 100 is not completely closed (step S31: NO), a normal rotation signal is output to the motor drive circuit 2 to normally rotate the motor 3, and the window 100 is closed (step S32). Then, it is determined whether the window 100 is completely closed (step S33), and if the window 100 is completely closed (step S33: YES), the processing is completed, and if the window 100 is not completely closed (step S33: NO), calculation processing of the variation amount of the rotation speed of the motor 3 is carried out (step S34) based on the current rotation speed of the motor 3 and the past rotation speed stored in the rotation speed storing section 82. Details of the calculation processing will also be described later.

If the variation amount of the rotation speed of the motor 3 is calculated in step S34, it is determined whether there is rotation abnormality of the motor 3 caused by a substance Z caught in the window based on a result of comparison between the variation amount and the predetermined threshold value stored in the memory 6 (step S35). If the substance Z is caught in the window 100 and the variation amount of the rotation speed of the motor 3 exceeds the threshold value, it is determined that there exists the rotation abnormality and, it is determined that a foreign substance is caught in the window 100 (step S36). Then, a reverse rotation signal is output from the motor drive circuit 2 to reversely rotate the motor 3, and the window 100 is opened (step S37). With this, the substance is released. Then, it is determined whether the window 100 is completely opened (step S38), and if the window 100 is completely opened (step S38: YES), the processing is completed, and if the window 100 is not completely opened (step S38: NO), the procedure is returned to step S37, and the reverse rotation of the motor 3 is continued.

If the substance Z is not caught in the window 100 in step S35 and the variation amount of the rotation speed of the motor 3 does not exceeds the threshold value, it is determined that there is NO rotation abnormality of the motor 3 (step S35: NO). Then, if the operation switch 1 is in the manual open MO (step S39: YES), the procedure is shifted to the later-described manual opening processing (step S40), and if the operation switch 1 is not in the manual open MO position (step S39: NO), it is determined whether the operation switch 1 is in the automatic open AO position (step S41). If the operation switch 1 is in the automatic open AO position (step S41: YES), the procedure is shifted to the later-described automatic opening processing (step S42), and if the operation switch 1 is not in the automatic open AO position (step S41: NO), the procedure is returned to step S32, and the normal rotation of the motor 3 is continued.

FIG. 9 is a flowchart showing detailed procedure of the manual opening processing in step S6 in FIG. 6, step S23 in FIG. 7 and step S40 in FIG. 8. These drawings do not have features of the present invention but an explanation thereof will be given. First, it is determined that the window 100 is completely opened by the manual opening action based on the output of the rotary encoder 4 (step S51). If the window 100 is completely opened (step S51: YES), the procedure is completed, and if the window 100 is not completely opened (step S51: NO), a reverse rotation signal is output from the motor drive circuit 2 to reversely rotate the motor 3, and the window 100 is opened (step S52). Then, it is determined whether the window 100 is completely opened (step S53), and if the window 100 is completely opened (step S53: YES), the procedure is completed, and if the window 100 is not completely opened (step S53: NO), it is determined whether the operation switch 1 is in the manual open MO position (step S54). If the operation switch 1 is in the manual open MO position (step S54: YES), the procedure is returned to step S52, reverse rotation of the motor 3 is continued, and if the operation switch 1 is not in the manual open MO position (step S54: NO), it is determined whether the operation switch 1 is in the automatic open AO position (step S55). If the operation switch 1 is in the automatic open AO position (step S55: YES), the procedure is shifted to the later-described automatic opening processing (step S56), and if the operation switch 1 is not in the automatic open AO position (step S55: NO), it is determined whether the operation switch 1 is in the manual close MC position (step S57). If the operation switch 1 is in the manual close MC position (step S57: YES), the procedure is shifted to the manual closing processing (step S58), and if the operation switch 1 is not in the manual close MC position (step S57: NO), it is determined whether the operation switch 1 is in the automatic close AC position (step S59). If the operation switch 1 is in the automatic close AC position (step S59: YES), the procedure is shifted to the automatic closing processing (step S60), and if the operation switch 1 is not in the automatic close AC position (step S59: NO), no processing is carried out and the procedure is completed.

FIG. 10 is a flowchart showing detailed procedure of the automatic opening processing in step S8 in FIG. 6, step S25 in FIG. 7, step S42 in FIG. 8 and step S56 in FIG. 9. Since these drawings have already been explained, explanation thereof will be omitted here. First, it is determined whether the window 100 is completely opened by the automatic opening action based on the output of the rotary encoder 4 (step S61). If the window 100 is completely opened (step S61: YES), the processing is completed, and if the window 100 is not completely opened (step S61: NO), a reverse rotation signal is output from the motor drive circuit 2 to reversely rotate the motor 3, thereby opening the window 100 (step S62). Then, it is determined whether the window 100 is completely opened (step S63). If the window 100 is completely opened (step S63: YES), the procedure is completed, and if the window 100 is not completely opened (step S63: NO), it is determined whether the operation switch 1 is in the manual close MC position (step S64). If the operation switch 1 is in the manual close MC position (step S64: YES), the procedure is shifted to the manual closing processing (step S65), and if the operation switch 1 is not in the manual close MC position (step S64: NO), it is determined whether the operation switch 1 is in the automatic close AC position (step S66). If the operation switch 1 is in the automatic close AC position (step S66: YES), the procedure is shifted to the automatic closing processing (step S67), and if the operation switch 1 is not in the automatic close AC (step S66: NO), the procedure is returned to step S62, and reverse rotation of the motor 3 is continued.

Figure 11:
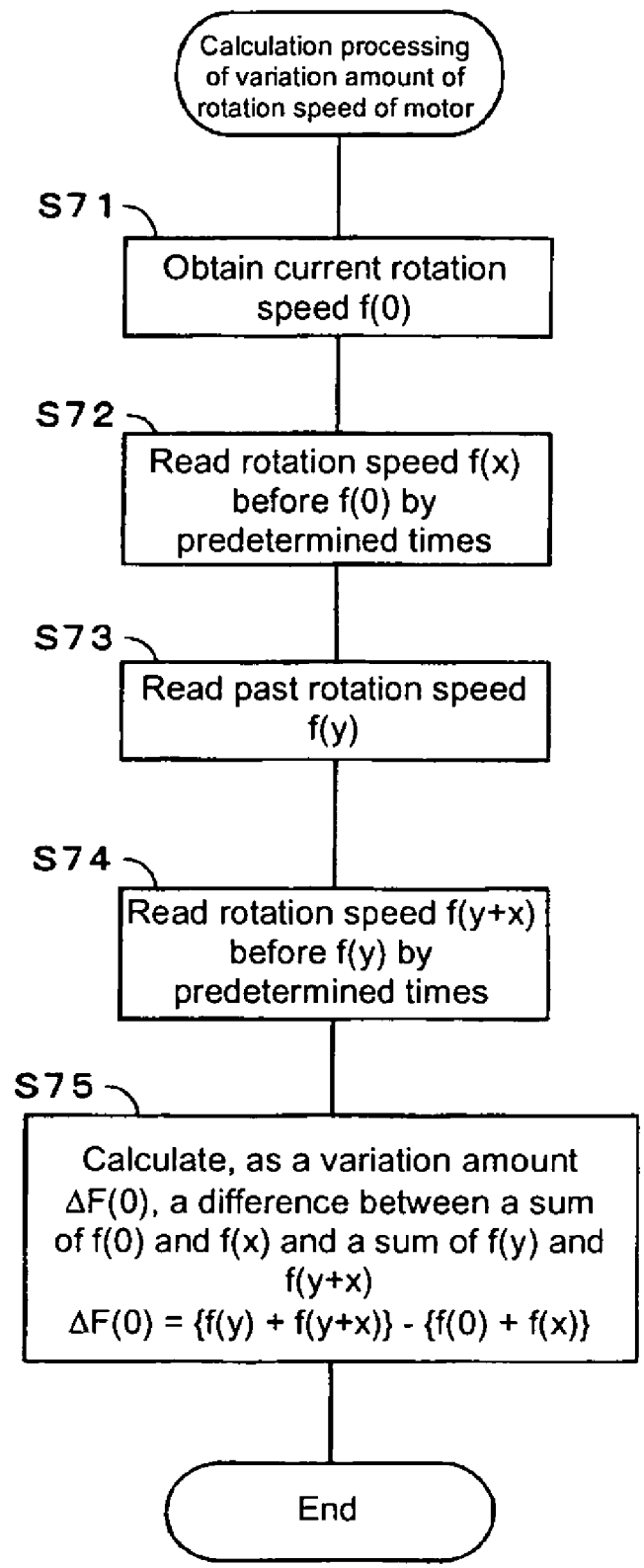
FIG. 11 shows a flowchart showing a detailed procedure of calculating processing of a variation amount of a rotation speed of a motor according to a first embodiment of the invention.

FIG. 11 is a flowchart showing detailed procedure of calculation processing of the variation amount of the rotation speed of the motor 3 in step S14 in FIG. 7 and step S34 in FIG. 8 according to the first embodiment. First, the current rotation speed f(0) is obtained by the rotation speed detection device 81 (step S71). Next, a rotation speed f(x) detected before predetermined times of the current rotation speed f(0) is read out from the rotation speed storing section 82 (step S72). Here, "x" is past arbitrary rotation speed detection time. Next, a past rotation speed f(y) is read out from the rotation speed storing section 82 (step S73). Here, "y" is also past arbitrary rotation speed detection time. A difference between "x" and time "0" is preferably different from a cycle of pulse of the rotation speed of the motor 3. The difference between "x" and "y" is not preferably an integral multiple of the cycle of the pulse of the rotation speed of the motor 3. To prevent reception of influence of pulse of rotation speed of the motor 3, it is preferable that the x is determined such that a difference between the "x" and the current time "0" becomes ½ of cycle of the pulse. Further, the rotation speed f(y+x) detected before predetermined times of the past rotation speed f(y) is read from the rotation speed storing section 82 (step S74). Here, "y+x" is past arbitrary rotation speed detection time that is older than "y". The "x" and "y" can be determined by previously measuring characteristics of the motor 3. The variation amount calculation device 83 calculates, as variation amount ΔF(0) of the rotation speed, a difference between a sum of the current rotation speed f(0) and the rotation speed f(x) detected before predetermined times thereof, and a sum of the past rotation speed f(y) and the rotation speed f(y+x) detected before predetermined times thereof (step S75).

$$\Delta F(0)=\{f(y)+f(y+x)\}-\{f(0)+f(x)\}$$

Figure 12:
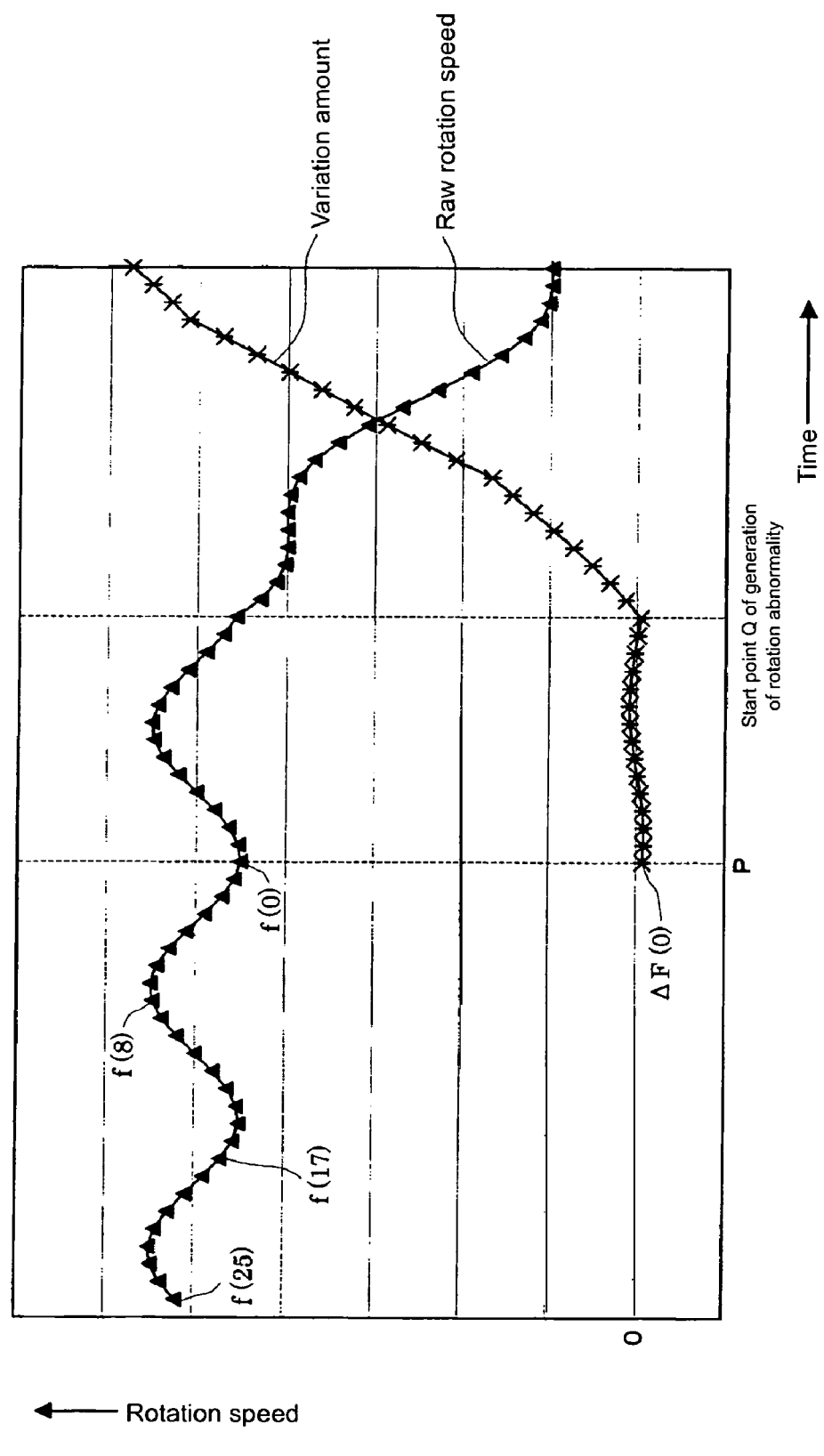
FIG. 12 shows a flowchart showing variation with time of variation amounts of a raw rotation speed and a rotation speed of the motor according to the first embodiment of the invention.

FIG. 12 shows a raw rotation speed of the motor 3 output from the rotation speed detection device 81 of the first embodiment which is not subjected to filtering processing, and shows variation with time of the variation amount of the rotation speed calculated in the above-described manner. A vertical axis shows the rotation speed and the variation amount, and the lateral axis shows rotation speed detection time. A central right broken line is an extension of a start point Q at which rotation abnormality of the motor 3 is generated due to a substance Z caught in the window 100 shown in FIG. 4. A left broken line is an extension of an arbitrary point P before the point Q. As shown on the left side from the point Q, the raw rotation speed is largely pulsated vertically such that acceleration and deceleration are repeated due to mechanical factor such as deviation of a center shaft of a pinion 109 shown in FIG. 4. The variation amount of the rotation speed is calculated such that at a point P for example, a raw rotation speed at that time is defined as a current rotation speed f(0), and a difference between a sum of the current rotation speed f(0) and a rotation speed f(8) before eight times thereof and a sum of a past rotation speed f(17) before 17 times of the current rotation speed f(0) and a rotation speed f(25) detected before eight times thereof is calculated as a variation amount ΔF(0). Here, x=8 and y=17. According to this calculation, as shown on the left side from the point Q, in the variation amount of the rotation speed, a degree of pulse becomes smaller than that of the raw rotation speed. As shown on the right side of the point Q, the variation amount of the rotation speed is largely increased in accordance with reduction of the rotation abnormality of the motor 3 generated by a substance caught in a window, i.e., in accordance with reduction in rotation speed.

If the variation amount of the rotation speed is calculated in step S75 shown in FIG. 11, calculation processing is completed, the procedure is shifted to step S15 in FIG. 7 or step S35 in FIG. 8, and it is determined whether there is rotation abnormality of the motor 3 based on a result of comparison between a variation amount ΔF(0) and a threshold value.

As in the first embodiment, a difference between a sum of two rotation speeds f(0) and f(x) including the current rotation speed f(0) of the motor 3 and a sum of past two rotation speeds f(y) and f(y+x) is calculated and defined as variation amount ΔF(0) of the rotation speed. With this, even if the rotation speed of the motor 3 is pulsated due to mechanical factor such as deviation of the shaft of the pinion 109, it is possible to reduce the degree of pulse of the variation amount. Therefore, if it is determined whether there is rotation abnormality of the motor 3 based on the result of comparison between the variation amount and threshold value, before the point Q is FIG. 12, erroneous determination that even through rotation abnormality caused by substance Z caught in a window is not generated, such situation is generated can be avoided, and it is possible to reliably detect generation of rotation abnormality caused by substance Z caught in the window after the point Q. That is, it is possible to detect whether there is a rotation abnormality of the motor 3 without receiving influence of pulse of rotation speed of the motor 3.

Figure 13:
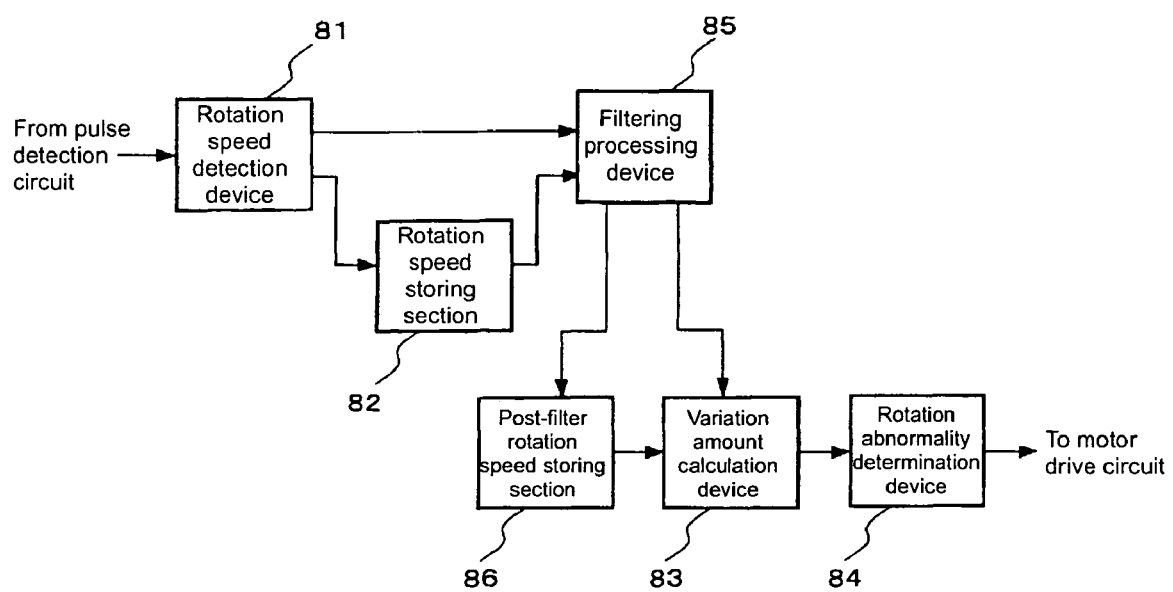
FIG. 13 shows a diagram showing a rotation abnormality detection block of a second embodiment of the invention.

FIG. 13 shows a rotation abnormality detection block of a second embodiment of the invention. According to the second embodiment, even if a plurality of pulse components are included in a rotation speed of the motor 3, the influence of the pulse is suppressed and a rotation abnormality of the motor 3 is detected. In FIG. 13, the same elements are designated with the same symbols as those shown in FIG. 5. In FIG. 5, a rotation speed output from the rotation speed detection device 81 and a rotation speed read from the rotation speed storing section 82 are directly input to the variation amount calculation device 83. In FIG. 13, both the rotation speeds are once input to the filtering processing device 85 and then to the variation amount calculation device 83, or both the rotation speeds are subjected to the filtering processing and then input to the variation amount calculation device 83 through a post-filter rotation speed storing section 86.

The filtering processing device 85 removes disturbance as will be described later from a current rotation speed output from the rotation speed detection device 81 and a past rotation speed stored in the rotation speed storing section 82. The filtering processing device 85 constitutes filtering means of the invention. The post-filter rotation speed storing section 86 sequentially stores rotation speeds after the filtering processing which are output from the filtering processing device 85. That is, a plurality of rotation speeds which are detected in predetermined cycle and from which disturbance is removed are sequentially stored in the post-filter rotation speed storing section 86. The post-filter rotation speed storing section 86 also provided in a predetermined region in the memory 6 like the rotation speed storing section 82, but the post-filter rotation speed storing section 86 may be provided in the control unit 8 as an independent memory. The rotation speed storing section 82 constitutes first storing means of the invention, and the post-filter rotation speed storing section 86 constitutes second storing means. In the second embodiment, the variation amount calculation device 83 calculates a variation amount of a rotation speed from a rotation speed after the current filtering processing which is output from the filtering processing device 85 and from a rotation speed after past filtering processing which is stored in the post-filter rotation speed storing section 86. The rotation speed detection device 81, the rotation speed storing section 82 and the rotation abnormality determination device 84 carry out the same processing as explained with reference to FIG. 5.

Figure 14:
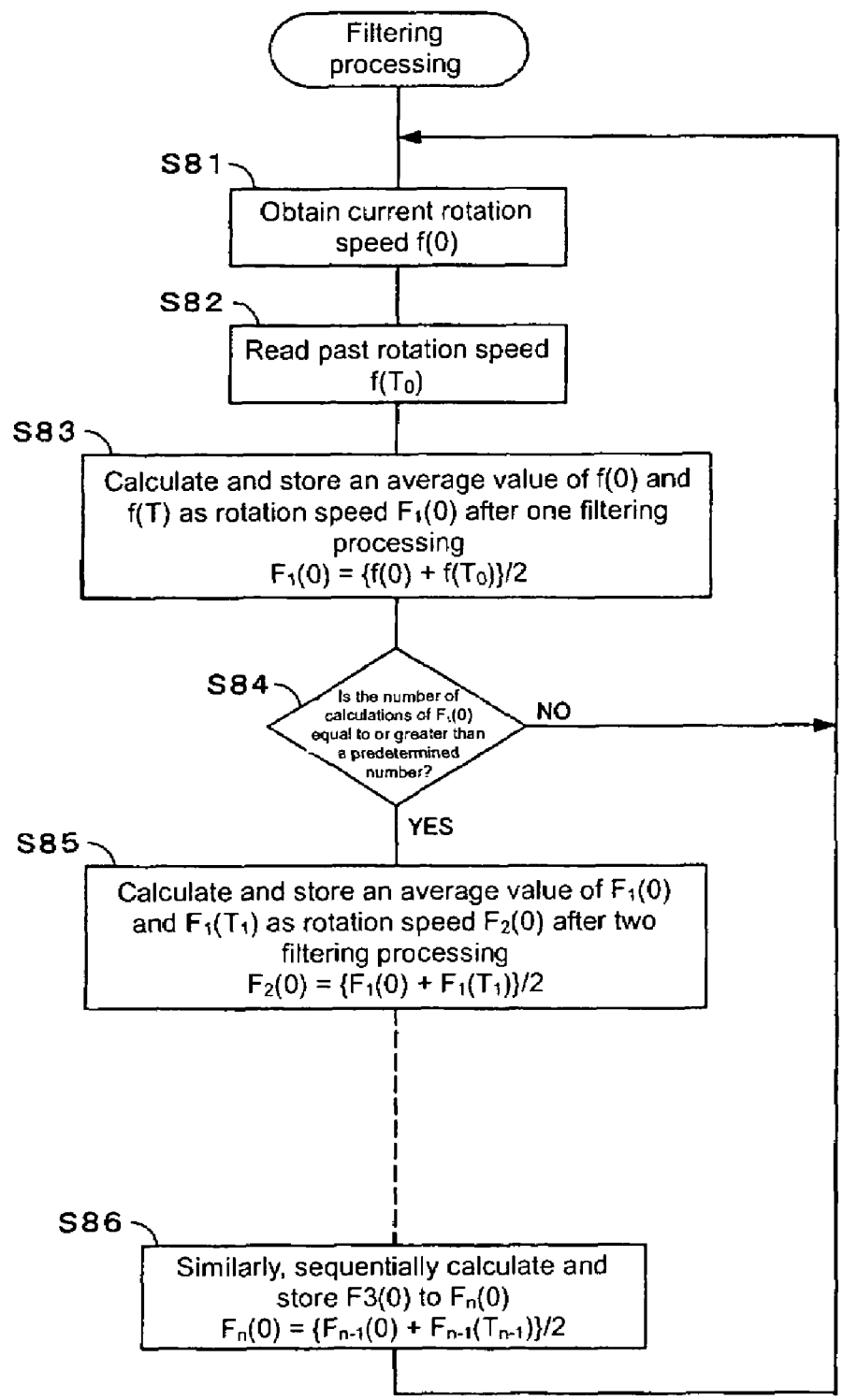
FIG. 14 shows a flowchart showing a detailed procedure of filtering processing of the second embodiment of the invention.

FIG. 14 is a flowchart showing detailed procedure of the filtering processing in the second embodiment. The filtering processing is started at the same time as or immediately after the start of the manual closing processing shown in FIG. 7 and the automatic closing processing shown in FIG. 8, and is completed at the same time as or immediately after the completion of the manual closing processing and the automatic closing processing. First, the rotation speed detection device 81 obtains the current rotation speed f(0) of the motor 3 (step S81). Next, a past rotation speed f(To) is read out from a predetermined region of the rotation speed storing section 82 (step S82). Here, "To" is a past arbitrary rotation speed detection time. It is preferable that "To" is ½ of cycle of the pulse of the rotation speed of the motor 3. The filtering processing device 85 calculates an average value of the current rotation speed f(0) and the past rotation speed f(To) as a rotation speed $F_1(0)$ after one filtering processing, and stores the same in the post-filter rotation speed storing section 86 (step S83).

$$F_1(0)=\{f(0)+f(To)\}/2$$

After the step S83, it is determined whether the number of calculations of the rotation speed $F_1(0)$ after one filtering processing is equal to or more than a predetermined number, i.e., whether a rotation speed after one filtering processing is stored predetermined times in the post-filter rotation speed storing section 86 (step S84). If the number of calculations of the rotation speed $F_1(0)$ after one filtering processing is less than the predetermined number (step S84: NO), the procedure is returned to step S81, and the processing from step S81 to step S84 is repeated. Then, after a while, if the number of calculations of the rotation speed $F_1(0)$ after one filtering processing becomes equal to or more than the predetermined number (step S84: YES), an average value of a rotation speed $F_1(0)$ after one current filtering processing, i.e., a rotation speed after one filtering processing calculated in immediately before step S83 and a rotation speed $F_1(T_1)$ after one past filtering processing which is read out from the post-filter rotation speed storing section 86 is calculated as a rotation speed $F_2(0)$ after two filtering processing, and this is stored in the post-filter rotation speed storing section 86 (step S85).

$$F_2(0)=\{F_1(0)+F_1(T_1)\}/2$$

After step S85, in the same manner as that when the rotation speed $F_2(0)$ after two filtering processing is calculated and stored, a rotation speed $F3(0)$ after three filtering processing to a rotation speed $F_n(0)$ after n-times filtering processing are sequentially calculated and stored (step S86). That is, the same processing as that of the steps S84 and S85 is repeatedly carried out in accordance with the number of filtering processing. More specifically, if the number of calculations of a rotation speed $F_{n-1}(0)$ after n-1 times filtering processing becomes equal to or more than the predetermined number, an average value of the rotation speed $F_{n-1}(0)$ after the n-t times current filtering processing and a rotation speed $F_{n-1}(T_{n-1})$ after n-1 times past filtering processing which is read out from the post-filter rotation speed storing section 86 is calculated as a rotation speed $F_n(0)$ after n-times filtering processing, and this is stored in the post-filter rotation speed storing section 86. Here, time "$T_0$ to $T_{n-1}$" is determined by previously measuring characteristics of the motor 3. More specifically, a plurality of pulse cycles of the motor 3 are measured. Time "$T_0$ to $T_{n-1}$" is determined in accordance with pulse cycle. If time "$T_0$ to $T_{n-1}$" is set to ½ of the pulse cycle, influence of pulse can sufficiently be suppressed.

$$F_n(0)=\{F_{n-1}(0)+F_{n-1}(T_{n-1})\}/2$$

After step S86, the procedure is returned to step S81, and processing of steps S81 to S86 is repeated until the manual closing processing and automatic closing processing are completed. With this, rotation speeds $F_1(0)$ to $F_n(0)$ from one filtering processing to n-times filtering processing are stored in the post-filter rotation speed storing section 86. It is preferable that the number of filtering processing is determined based on the number of pulse components included in the rotation speed of the motor 3. For example, when three pulse components are included in a rotation speed of the motor 3, if the filtering processing is carried out three times, influence of three pulse components can be suppressed.

Figure 15:
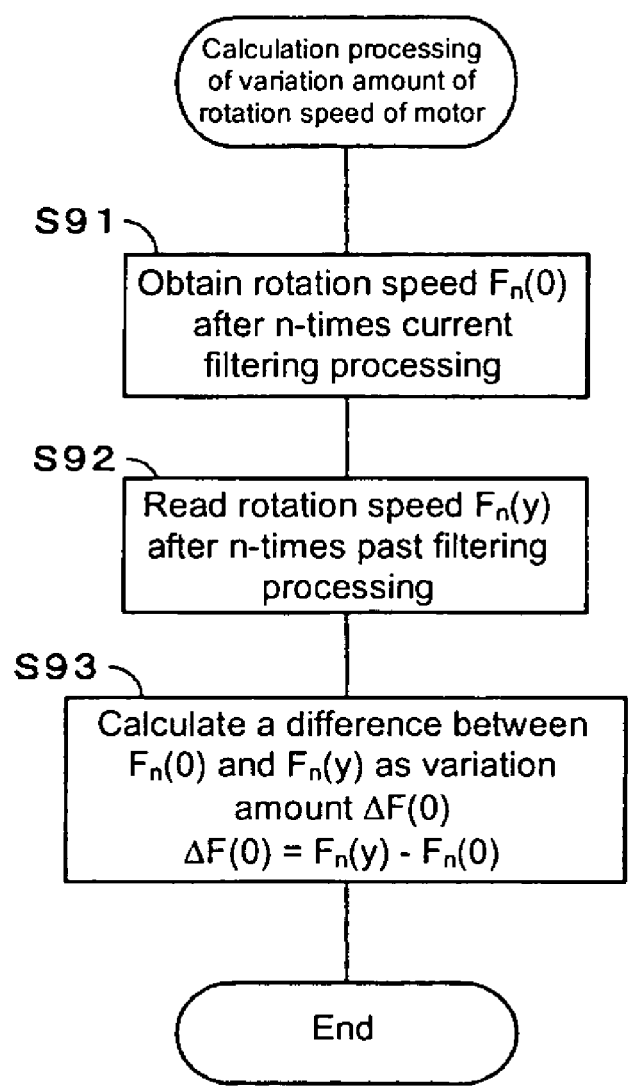
FIG. 15 shows a flowchart showing a detailed procedure of calculating processing of a variation amount of a rotation speed of a motor according to a second embodiment of the invention.

FIG. 15 is a flowchart showing detailed procedure of calculation processing of a variation amount of a rotation speed of the motor 3 in step S14 in FIG. 7 and step S34 in FIG. 8 according to the second embodiment. First, the filtering processing device 85 obtains a rotation speed $F_n(0)$ after n-times current filtering processing (step S91). Next, a rotation speed $F_n(y)$ after n-times past filtering processing is read out from the post-filter rotation speed storing section 86 (step S92). The variation amount calculation device 83 calculates a difference between a rotation speed $F_n(0)$ after n-times current filtering processing and a rotation speed $F_n(y)$ after n-times past filtering processing as a variation amount $\Delta F(0)$ of a rotation speed (step S93).

$$\Delta F(0)=F_n(y)-F_n(0)$$

Figure 16:
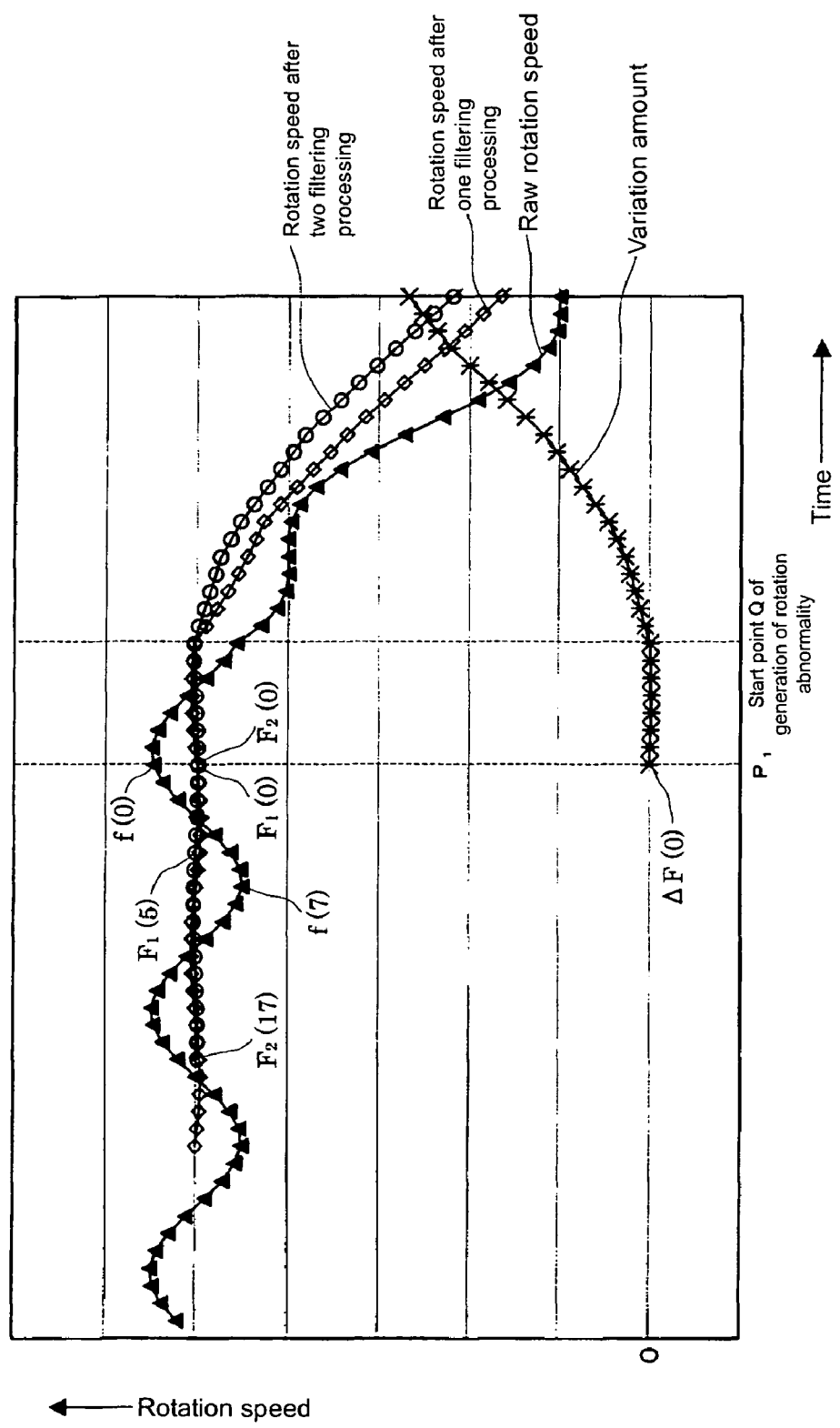
FIG. 16 shows a flowchart showing a raw rotation speed of the motor, a rotation speed thereof after filtering and variation with time of a variation amount of the rotation speed according to the second embodiment of the invention.

FIG. 16 shows a raw rotation speed of the motor 3 output from the rotation speed detection device 81 in the second embodiment, a rotation speed after filtering processing (after one filtering processing and after two filtering processing) calculated as described above, and variation with time of a variation amount of a rotation speed. As shown on the left side from the generation start point Q of rotation abnormality of the motor 3 caused by substance caught in the window, in the raw rotation speed, acceleration and deceleration is repeated by disturbance caused by the mechanical factor and the raw rotation speed is vertically largely pulsated. At a point P1 for example, a raw rotation speed at that time is defined as a current rotation speed f(0), an average value between the current rotation speed f(0) and a past rotation speed f(7) before seven times thereof is defined as a rotation speed $F_1(0)$ after one filtering processing, and a rotation speed after one filtering processing is calculated. Further, at a point P1, an average value of a rotation speed $F_1(0)$ after one current filtering processing and a rotation speed $F_1(5)$ after one past filtering processing is calculated as a rotation speed $F_2(0)$ after two filtering processing. Further, concerning a variation amount of a rotation speed, a rotation speed after two filtering processing is defined as a rotation speed after n-times filtering processing, a difference between a rotation speed $F_2(0)$ after two current filtering processing and a rotation speed $F_2(17)$ after 17 past filtering processing is calculated as a variation amount $\Delta F(0)$. Since FIG. 16 is a schematic diagram, a second pulse component is not clearly illustrated concerning a raw rotation speed.

According to the calculation, as shown on the left side from the point Q, concerning a rotation speed after filtering processing, a degree of pulse becomes smaller than a raw rotation speed, and becomes smaller as the number of filtering processing is increased. Concerning a variation amount of a rotation speed, a degree of pulse becomes smaller than a raw rotation speed. Further, as shown on the right side from the point Q, the variation amount of the rotation speed is largely increased in accordance with a rotation abnormality (reduction of rotation speed) of the motor 3 generated due to substance caught in a window.

After the variation amount of the rotation speed is calculated in step S93 shown in FIG. 15, the calculation processing is completed, the procedure is shifted to step S15 in FIG. 7 or step S35 in FIG. 8, and it is determined whether there is a rotation abnormality of the motor 3 based on a result of comparison between the variation amount $\Delta F(0)$ and the threshold value as described above.

An average value of two rotation speeds f(0) and $f(T_0)$ including a current rotation speed f(0) of the motor 3 as in the above-described second embodiment is calculated as a rotation speed $F_1(0)$ after filtering processing, and rotation speeds $F_2(0)$ to $F_n(0)$ after two or more new filtering processing are sequentially calculated based on the rotation speed $F_1(0)$. Then, a difference between rotation speeds $F_n(0)$ and $F_n(y)$ after n-times current and past filtering processing is calculated as a variation amount $\Delta F(0)$ of the rotation speed. With this, even if the rotation speed of the motor 3 is pulsated by disturbance, the disturbance is removed from the raw rotation speed over a plurality of times, and a degree of pulse of the variation amount can further be suppressed to a small level. Therefore, if it is determined whether there is rotation abnormality of the motor 3 based on the result of comparison between the variation amount and the threshold value, before the point Q in FIG. 16, when rotation abnormality due to a substance Z caught in the window is not generated, erroneous determination that the rotation abnormality is generated can be avoided, and after the point Q, generation of the rotation abnormality caused by a substance Z caught in the window can reliably be detected. That is, it is possible to precisely detect whether or not there is rotation abnormality of the motor 3 without receiving influence of pulse of the rotation speed of the motor 3.

Figure 17:
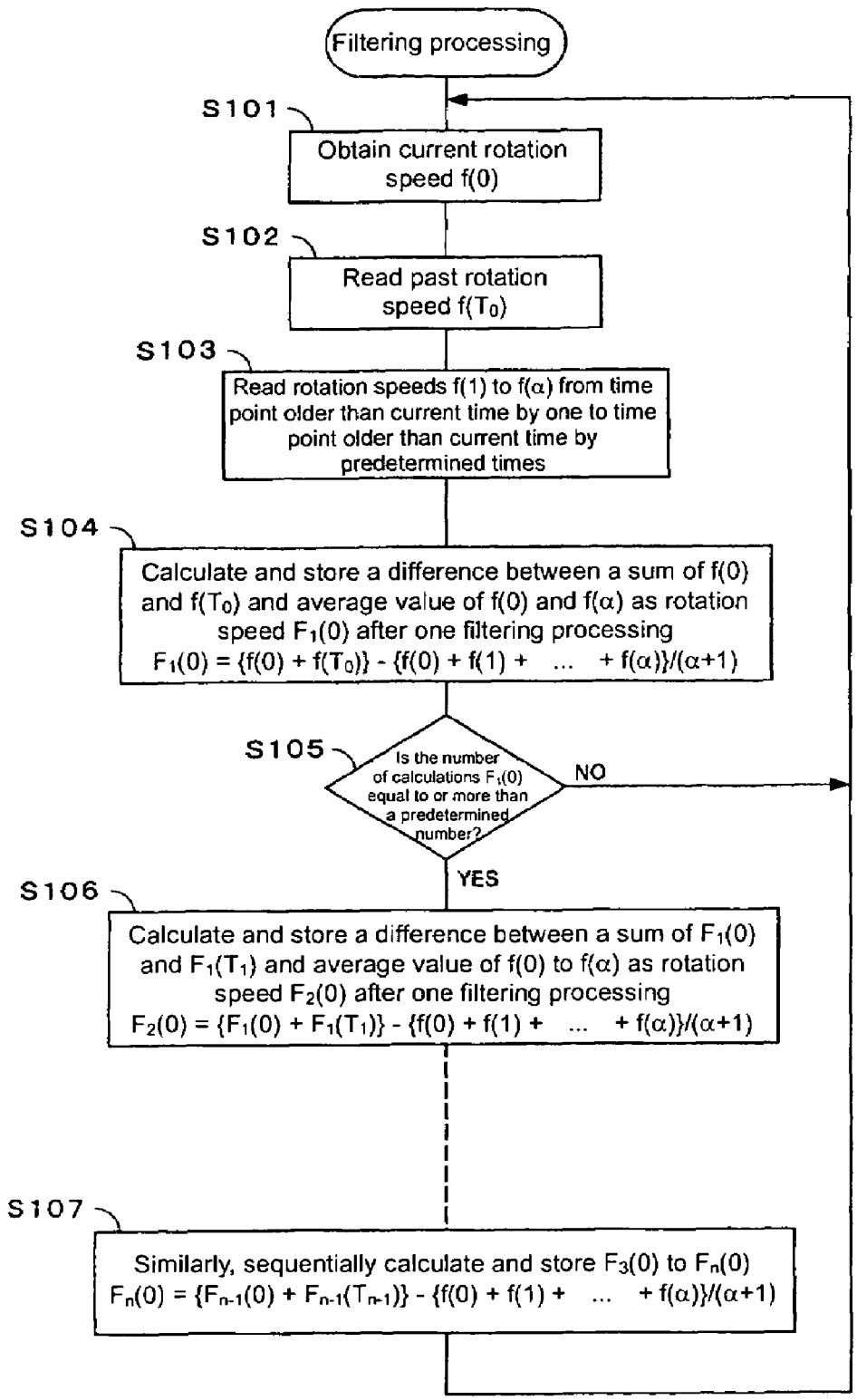
FIG. 17 shows a flowchart showing a detailed procedure of filtering processing of a third embodiment of the invention.

FIG. 17 is a flowchart showing detailed procedure of filtering processing in a third embodiment of the present invention. The filtering processing is started at the same time as or immediately after the start of the manual closing processing in FIG. 7 and automatic closing processing in FIG. 8, and is completed at the same time as or immediately after the completion of the manual closing processing in FIG. 7 and automatic closing processing in FIG. 8. The rotation abnormality detection block of the third embodiment has the same structure as that shown in FIG. 13, and FIG. 13 is cited as the third embodiment. The calculation processing of the variation amount of the rotation speed of the motor 3 in the third embodiment is the same as that shown in FIG. 15, and FIG. 15 is also cited as the third embodiment.

In FIG. 17, a current rotation speed f(0) of the motor 3 is obtained by the rotation speed detection device 81 (step S101). Next, past rotation speed $f(T_0)$ is read out from the rotation speed storing section 82 (step S102). Next, all of rotation speeds f(1) to f($\alpha$) detected from the last time to a point before a predetermined times are read out from the rotation speed storing section 82 (step S103). Here, "1" is rotation speed detection time of last time, and "$\alpha$" is past rotation speed detection time. A difference between "$\alpha$" and "$T_0$" is an integral multiple of a difference between "$T_0$" and the current time, and is preferably greater than "$T_0$". This is because that it is desired to calculate an average value in time more than cycle of pulse. Especially, it is preferable that it is an integral multiple of twice of the difference between "$T_0$" and the current time. The filtering processing device 85 calculates a difference between the sum of the current rotation speed f(0) and the past rotation speed $f(T_0)$ and the average value of the rotation speeds f(0) to f($\alpha$) from the current time to a point before a predetermined times as a rotation speed $F_1(0)$ after one filtering processing, and this is stored in the post-filter rotation speed storing section 86 (step S104).

$$F_1(0)=\{f(0)+f(T_0)\}-\text{average values } \{f(0) \text{ to } f(\alpha)\}$$

$$\text{Average values } \{f(0) \text{ to } f(\alpha)\}=\{f(0)+f(1)+ \ldots +f(\alpha)\}/(\alpha+1)$$

After step S104, it is determined whether the number of calculations of the rotation speed $F_1(0)$ after one filtering processing is equal to or more than a predetermined number (step S105), and if the number of calculations is less than the predetermined number (step S105: NO), the procedure is returned to step S101 and processing from step S101 to step S105 is repeated. Then, after a while, if the number of calculations of the rotation speed $F_1(0)$ after one filtering processing becomes equal to or greater than the predetermined number in step S105 (step S105: YES), a difference between the sum of the rotation speed $F_1(0)$ after one current filtering processing, i.e., the rotation speed after one filtering processing calculated in step S104 and the rotation speed $F_1(T_1)$ after one past filtering processing which is read out from the post-filter rotation speed storing section 86 and the average value {f(0) to f(α)} is calculated as the rotation speed F$_2$(0) after two filtering processing, and this is stored in the post-filter rotation speed storing section 86 (step S106).

$$F_2(0)=\{F_1(0)+F_1(T_1)\}-\text{average value }\{f(0)\text{ to }f(\alpha)\}$$

After step S106, rotation speeds from a rotation speed F3(0) after three filtering processing to a rotation speed F$_n$(0) after n-times filtering processing are sequentially calculated and stored (step S107) in the same manner as that when the rotation speed F$_2$(0) after two filtering processing is calculated and stored. That is, the same processing as that of steps S104 and S105 is repeatedly carried out in accordance with the number of filtering processing. More specifically, when the number of calculations of the rotation speed F$_{n-1}$(0) after n−1-times filtering processing becomes equal to or more than a predetermined number, a difference between the sum of a rotation speed F$_{n-1}$(0) after n−1-times current filtering processing and a rotation speed F$_{n-1}$(T$_{n-1}$) after n−1-times past filtering processing which is read out from the post-filter rotation speed storing section 86 and the average value {f(0) to f(α)} is calculated as a rotation speed F$_n$(0) after n-times filtering processing, and this is stored in the post-filter rotation speed storing section 86.

$$F_n(0)=\{F_{n-1}(0)+F_{n-1}(T_{n-1})\}-\text{average value }\{f(0)\text{ to }f(\alpha)\}$$

After step S107, the procedure is returned to step S101, and processing of steps S101 to S107 is repeated until the manual closing processing and automatic closing processing are completed. With this, rotation speeds F$_1$(0) to F$_n$(0) from a time point after one filtering processing to a time point after n-times of filtering processing are stored in the post-filter rotation speed storing section 86.

Thereafter, the calculation processing of a variation amount of a rotation speed of the motor 3 in step S14 in FIG. 7 and step S34 in FIG. 8 is carried out based on the procedure shown in FIG. 15. In this case, in step S93 in FIG. 15, a difference between the rotation speed F$_n$(0) after n-times current filtering processing calculated in the filtering processing shown in FIG. 17 and the rotation speed F$_n$(y) of n-times past filtering processing is calculated as a variation amount ΔF(0) of a rotation speed.

Figure 18:
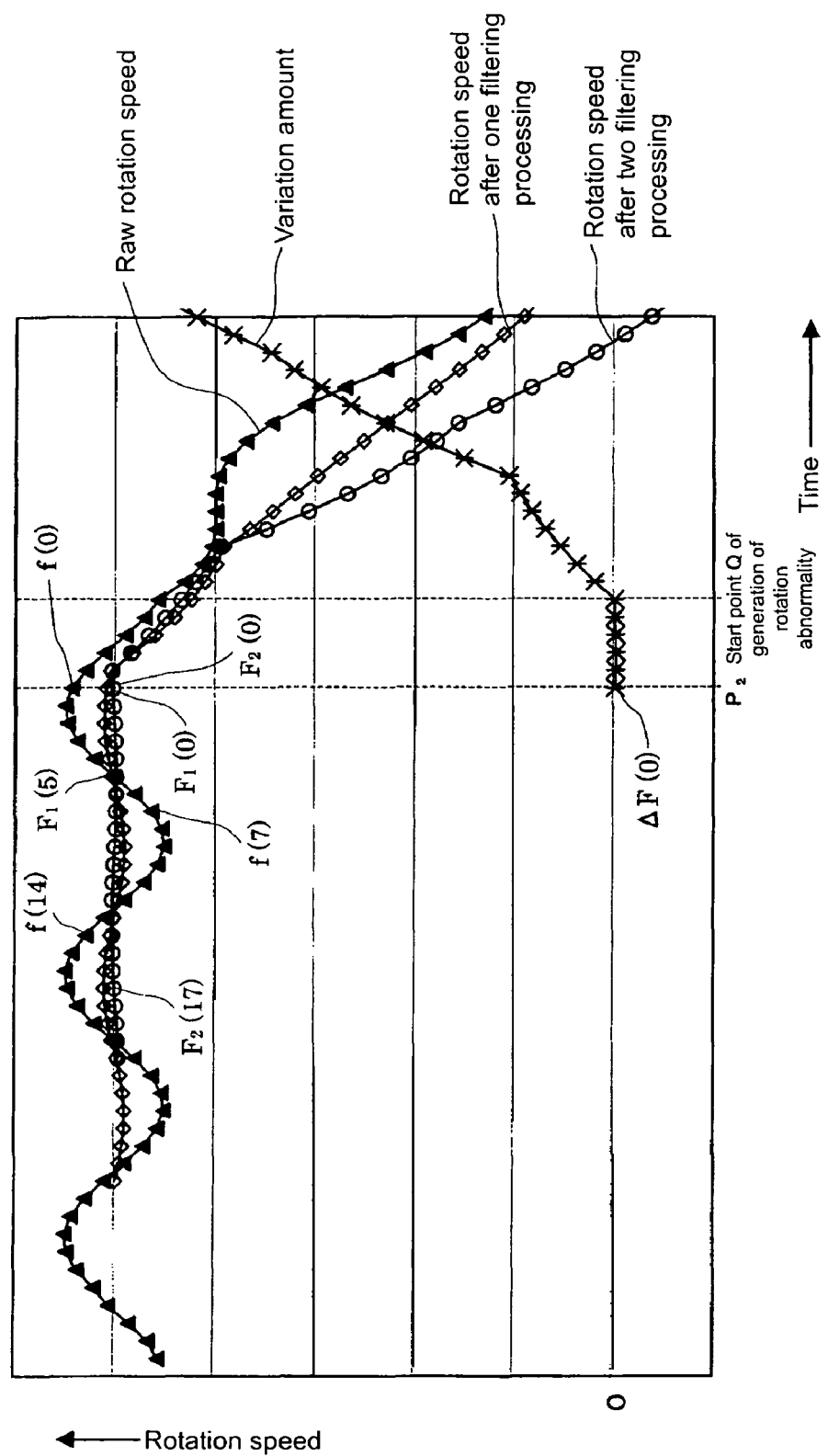
FIG. 18 shows a flowchart showing a raw rotation speed of the motor, a rotation speed thereof after filtering and variation with time of a variation amount of the rotation speed according to the third embodiment of the invention.

FIG. 18 shows a raw rotation speed of the motor 3 output from the rotation speed detection device 81 in the third embodiment, a rotation speed after filtering processing (after one filtering processing and after two filtering processing) calculated as described above, and variation with time of a variation amount of a rotation speed. As shown on the left side from the point Q, the raw rotation speed is largely pulsated vertically due to disturbance. Since FIG. 18 is a schematic diagram, second and subsequent pulse components are not precisely illustrated concerning the raw rotation speed. Concerning a rotation speed after one filtering processing, at a point P$_2$ for example, a raw rotation speed at that time is defines as a current rotation speed f(0), and a difference between a sum of the current rotation speed f(0) and a past rotation speed f(7) which is before seven times and an average value of all of rotation speeds f(0) to f(14) from the current time to before 14 times is calculated as a rotation speed F$_1$(0) after one filtering processing. Concerning a rotation speed after two filtering processing, at the point P$_2$ for example, a difference between a sum of a rotation speed F$_1$(0) after one current filtering processing and a rotation speed F$_1$(5) after one past filtering processing before five times and an average value of the rotation speeds f(0) to f(14) is calculated as a rotation speed F$_2$(0) after two filtering processing. Concerning a variation amount of a rotation speed, a rotation speed after two filtering processing is defined as a rotation speed after n-times filtering processing, at the point P$_2$ for example, a difference between a rotation speed F$_2$(0) after two current filtering processing and a rotation speed F$_2$(17) after two past filtering processing before 17 times is calculated as a variation amount ΔF(0).

According to such calculation, as shown on the left side from the point Q, concerning a rotation speed after filtering processing, a degree of pulse becomes smaller than a raw rotation speed, and as the number of filtering processing is increased, the rotation speed becomes smaller. Concerning a variation amount of a rotation speed also, a degree of pulse becomes smaller than the raw rotation speed. As shown on the right side from the point Q, the variation amount of the rotation speed is largely increased in accordance with rotation abnormality of the motor 3 generated by a substance caught in a window (reduction in rotation speed).

As described in step S93 in FIG. 15, after the variation amount of the rotation speed is calculated, the calculation processing is completed, procedure is shifted to step S15 in FIG. 7 or step S35 in FIG. 8, and it is determined whether there is rotation abnormality of the motor 3 based on a result of comparison between the variation amount ΔF(0) and the threshold value.

As in the third embodiment, an average value of rotation speeds f(0) to f(α) is subtracted from a sum of two rotation speeds f(0) and f(To) including the current rotation speed f(0) of the motor 3, a result of the subtraction is defined as a rotation speed F$_1$(0) after filtering processing, and rotation speeds F$_2$(0) to F$_n$(0) after a plurality of new filtering processing are sequentially calculated based on the rotation speed F$_1$(0). Then, a difference between rotation speeds F$_n$(0) and F$_n$(y) after n-times current and past filtering processing is calculated as a variation amount ΔF(0) of a rotation speed. With this, disturbance is removed from the raw rotation speed of the motor 3 over a plurality of times, and a degree of pulse of the variation amount can further be suppressed to a small level. Therefore, if it is determined whether there is rotation abnormality of the motor 3 based on the result of comparison between the variation amount and the threshold value, before the point Q in FIG. 18, when rotation abnormality due to a substance Z caught in the window is not generated, erroneous determination that the rotation abnormality is generated can be avoided, and after the point Q, generation of the rotation abnormality caused by a substance Z caught in the window can reliably be detected. That is, it is possible to precisely detect whether or not there is rotation abnormality of the motor 3 without receiving influence of pulse of the rotation speed of the motor 3.

Figure 19:
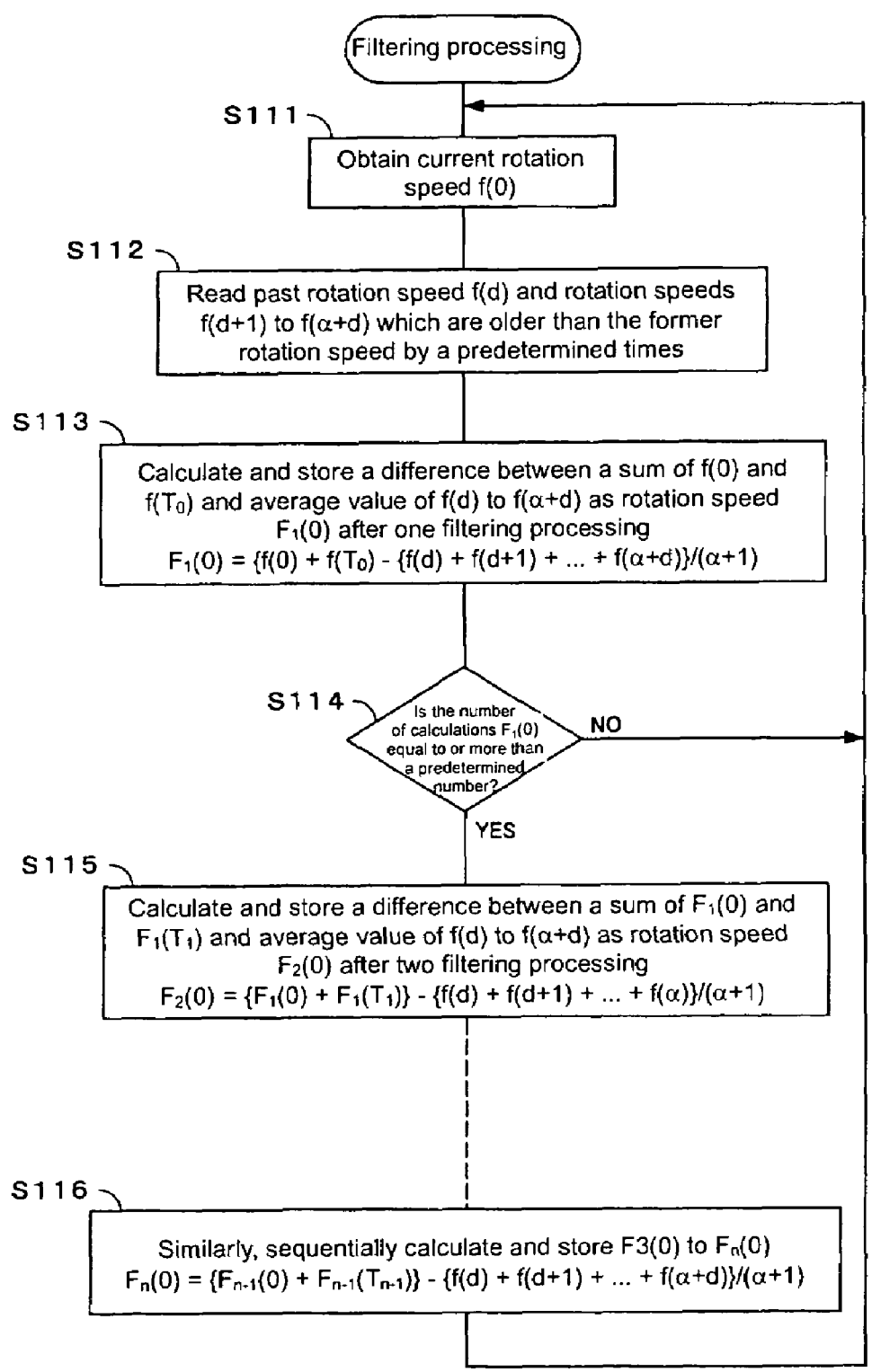
FIG. 19 shows a flowchart showing a detailed procedure of filtering processing of a fourth embodiment of the invention.

FIG. 19 is a flowchart showing detailed procedure of filtering processing in a fourth embodiment of the present invention. The filtering processing is started at the same time as or immediately after the start of the manual closing processing in FIG. 7 and automatic closing processing in FIG. 8, and is completed at the same time as or immediately after the completion of the manual closing processing in FIG. 7 and automatic closing processing in FIG. 8. The rotation abnormality detection block of the fourth embodiment has the same structure as that shown in FIG. 13, FIG. 13 is cited as the fourth embodiment. The calculation processing of the variation amount of the rotation speed of the motor 3 in the fourth embodiment is the same as that shown in FIG. 15, FIG. 15 is also cited as the fourth embodiment.

In FIG. 19, first, a current rotation speed f(0) of the motor 3 is obtained by the rotation speed detection device 81 (step S111). Next, a past rotation speed f(d) and rotation speeds f(d) to f($\alpha$+d) before predetermined times are read out from the rotation speed storing section 82 (step S112). Here, "d" is time before the current time by predetermined time. The filtering processing device 85 calculates a difference between an average value of the past rotation speeds f(d) to f($\alpha$+d) which do not include the current rotation speed f(0) and a sum of the current rotation speed f(0) and the past rotation speed f(T$_0$) as a rotation speed F$_1$(0) after one filtering processing, and this is stored in the post-filter rotation speed storing section 86 (step S113).

$F_1(0) = \{f(0) + f(T_1)\}$–average value $\{f(d) \text{ to } f(\alpha+d)\}$

Average value $\{f(d) \text{ to } f(\alpha+d)\} = \{f(d) + f(d+1) + \ldots + f(\alpha+d)\}/(\alpha+1)$ After step S113, it is determined whether the number of calculations of the rotation speed F$_1$(0) after one filtering processing is equal to or greater than a predetermined number (step S114), and if the number of calculation is less than the predetermined number (step S114: NO), the procedure is returned to step S111 and the processing to step S114 is repeated. After a while, if the number of calculation of the rotation speed F$_1$(0) after one filtering processing becomes equal to or greater than the predetermined number (step S114: YES), a difference between the average value {f(d) to f($\alpha$+d)} and a sum of the rotation speed F$_1$(0) after one current filtering processing, i.e., a rotation speed after one filtering processing calculated in step S114 and a rotation speed F$_1$(T$_1$) after one past filtering processing which is read from the post-filter rotation speed storing section 86 is calculated as a rotation speed F$_2$(0) after two filtering processing, and this is stored in the post-filter rotation speed storing section 86 (step S1 115).

$F_2(0) = \{F_1(0) + F_1(T_1)\}$–average value $\{f(d) \text{ to } f(\alpha+d)\}$ After step S115, rotation speeds from a rotation speed F3(0) after three filtering processing to a rotation speed F$_n$(0) after n-times filtering processing are sequentially calculated and stored (step S116) in the same manner as that when the rotation speed F$_2$(0) after two filtering processing is calculated and stored. That is, the same processing as that of steps S113 and S114 is repeatedly carried out in accordance with the number of filtering processing. More specifically, when the number of calculations of the rotation speed F$_{n-1}$(0) after n–1-times filtering processing becomes equal to or more than a predetermined number, a difference between a sum of a rotation speed F$_{n-1}$(0) after n–1-times current filtering processing and a rotation speed F$_{n-1}$(T$_{n-1}$) after n–1-times past filtering processing which is read out from the post-filter rotation speed storing section 86 and the average value {f(d) to f($\alpha$+d)} is calculated as a rotation speed F$_n$(0) after n-times filtering processing, and this is stored in the post-filter rotation speed storing section 86.

$F_n(0) = \{F_{n-1}(0) + F_{n-1}(T_{n-1})\}$–average value $\{f(d) \text{ to } f(\alpha+d)\}$ After step S116, the procedure is returned to step S111, and processing of steps S111 to S116 is repeated until the manual closing processing and automatic closing processing are completed. With this, rotation speeds F$_1$(0) to F$_n$(0) from a time point after one filtering processing to a time point after n-times of filtering processing are stored in the post-filter rotation speed storing section 86.

Thereafter, the calculation processing of a variation amount of a rotation speed of the motor 3 in step S14 in FIG. 7 and step S34 in FIG. 8 is carried out based on the procedure shown in FIG. 15. In this case, in step S93 in FIG. 15, a difference between the rotation speed F$_n$(0) after n-times current filtering processing calculated in the filtering processing shown in FIG. 19 and the rotation speed F$_n$(y) of n-times past filtering processing is calculated as a variation amount $\Delta$F(0) of a rotation speed.

Figure 20:
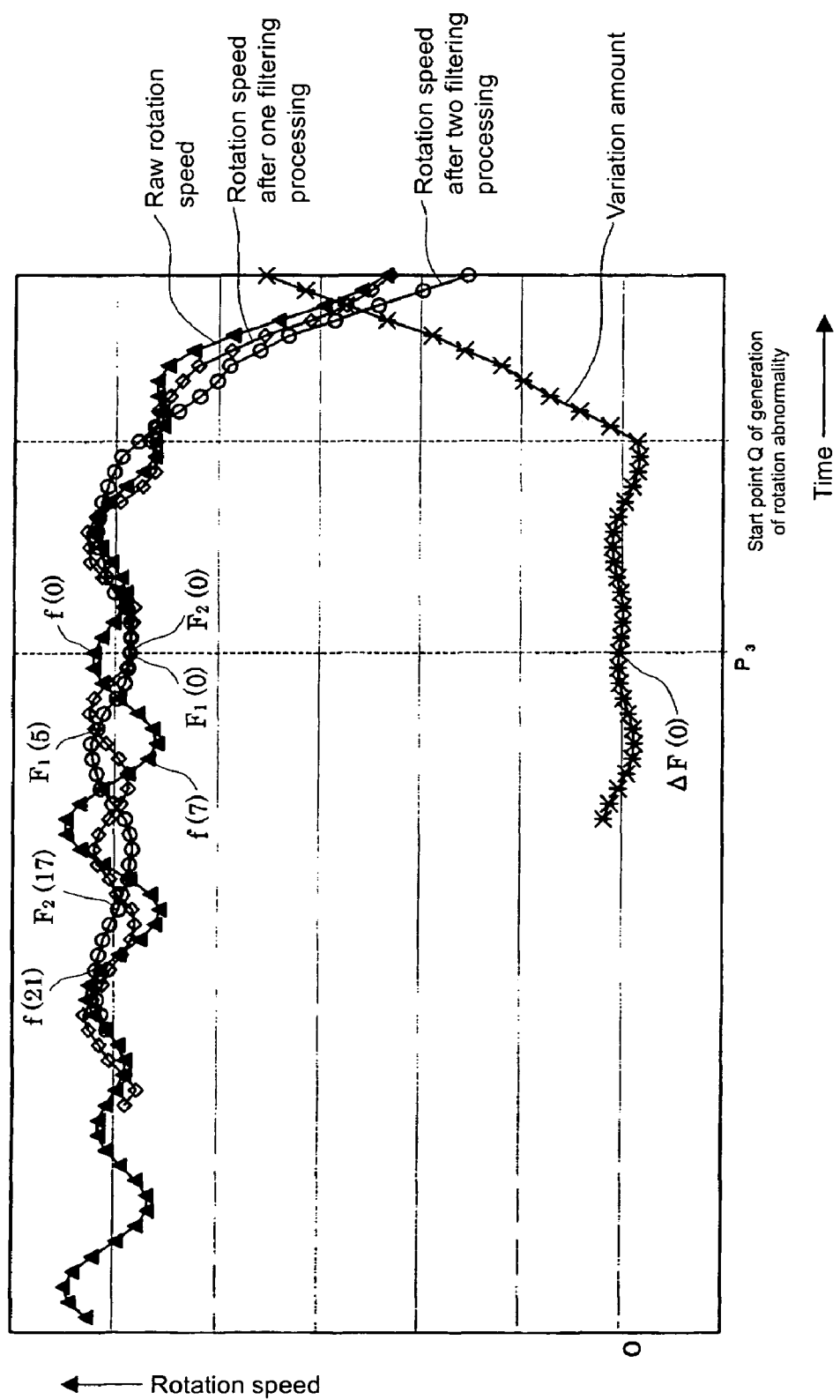
FIG. 20 shows a flowchart showing a raw rotation speed of the motor, a rotation speed thereof after filtering and variation with time of a variation amount of the rotation speed according to the fourth embodiment of the invention.

FIG. 20 shows a raw rotation speed of the motor 3 output from the rotation speed detection device 81 in the fourth embodiment, a rotation speed after filtering processing (after one filtering processing and after two filtering processing) calculated as described above, and variation with time of a variation amount of a rotation speed. As shown on the left side from the point Q, the raw rotation speed is largely pulsated vertically due to disturbance. Since FIG. 20 is a schematic diagram, second and subsequent pulse components are not precisely illustrated concerning the raw rotation speed. Concerning a rotation speed after one filtering processing, at a point P$_3$ for example, a raw rotation speed at that time is defined as a current rotation speed f(0), and a difference between a sum of the current rotation speed f(0) and a past rotation speed f(7) which is before seven times and an average value of all of rotation speeds f(7) to f(21) from the past to time point before 14 times is calculated as a rotation speed F$_1$(0) after one filtering processing. Concerning a rotation speed after two filtering processing, at a point P$_3$ for example, a difference between a sum of the rotation speed F$_1$(0) after one current filtering processing and a rotation speed F$_1$(5) after one past filtering processing before five times and an average value of the rotation speeds f(7) to f(21) is calculated as a rotation speed F$_2$(0) after two filtering processing. Concerning a variation amount of a rotation speed, a rotation speed after two filtering processing is defined as a rotation speed after n-times filtering processing, at the point P$_3$ for example, a difference between a rotation speed F$_2$(0) after two current filtering processing and a rotation speed F$_2$(17) after two past filtering processing before 17 times is calculated as a variation amount $\Delta$F(0).

According to such calculation, as shown on the left side from the point Q, concerning a rotation speed after filtering processing, a degree of pulse becomes smaller than a raw rotation speed, and as the number of filtering processing is increased, the rotation speed becomes smaller. Concerning a variation amount of a rotation speed also, a degree of pulse becomes smaller than the raw rotation speed. As shown on the right side from the point Q, the variation amount of the rotation speed is largely increased in accordance with rotation abnormality of the motor 3 generated by a substance caught in a window (reduction in rotation speed).

As described in step S93 in FIG. 15, after the variation amount of the rotation speed is calculated, the calculation processing is completed, procedure is shifted to step S15 in FIG. 7 or step S35 in FIG. 8, and it is determined whether there is rotation abnormality of the motor 3 based on a result of comparison between the variation amount $\Delta$F(0) and the threshold value.

If the average value of the past rotation speed f(d) to f($\alpha$+d) is calculated without including the current rotation speed f(0) of the motor 3 as in the fourth embodiment, when rotation abnormality of the motor 3 caused by substance Z caught in the window 100 is generated (after point Q in FIG. 20), rotation speed F$_1$(0) to F$_n$(0) after filtering processing are sequentially calculated in accordance with procedure shown in FIG. 19, and a variation amount $\Delta$F(0) of the rotation speed is calculated in accordance with the procedure shown in FIG. 15. With this, it is possible to suppress only pulse caused due to disturbance by mechanical factor to a small level without suppressing reduction variation of a rotation speed caused by rotation abnormality included in the variation amount. Therefore, before the point Q in FIG. 20, when rotation abnormality caused by substance Z caught in a window is not generated, it is possible to prevent an erroneous determination that the rotation abnormality is generated, and after the point Q, it is possible to reliably detect the generation of rotation abnormality caused by substance Z caught in the window by determining whether there is rotation abnormality of the motor 3 based on a result of comparison between the variation amount and the threshold value. That is, it is possible to more precisely detect whether or not there is rotation abnormality of the motor 3 without receiving influence of pulse of the rotation speed of the motor 3.

In the second to fourth embodiments, after the calculation of rotation speed after one filtering processing, a rotation speed after two or more filtering processing is calculated, and a variation amount of a rotation speed is calculated from the rotation speed after finally calculated n-times filtering processing. However, the present invention is not limited to this, and a variation amount of a rotation speed may be calculated from a rotation speed after one filtering processing.

Although the present invention is applied to an apparatus which control the opening and closing motions of a window of a door in a vehicle. The invention can also be applied to apparatuses for controlling opening and closing motions of various opening/closing bodies such as a sunroof of a ceiling of a vehicle, a rear door of a vehicle, a window of a building, a door of a building and the like.

What is claimed is:

1. A motor control apparatus comprising
   a detection device for detecting a rotation speed of a motor,
   a storing section for successively storing the rotation speed detected by the detection device,
   a calculation device for calculating a variation amount of the rotation speed from current rotation speed which is output from the detection device and from past rotation speed stored in the storing section,
   determining device for determining whether there is rotation abnormality of the motor based on a result of comparison between the variation amount calculated by the calculation device and a preset threshold value, and
   control device for controlling the motor in accordance with a result of determination of the determining device, wherein
   the calculation device calculates the variation amount from a sum of the current rotation speed and a rotation speed detected before predetermined times thereof, and a sum of the past rotation speed and a rotation speed detected before predetermined times thereof.

2. A motor control apparatus comprising
   a detection device for detecting a rotation speed of a motor,
   a first storing section for successively storing the rotation speed detected by the detection device,
   a filtering device for removing a disturbance from a current rotation speed output from the detection device and from a past rotation speed stored in the first storing section,
   a second storing section for storing the rotation speed subjected to filtering processing and output from the filtering device,
   a calculation device for calculating a variation amount of a rotation speed from the rotation speed subjected to the current filtering processing output from the filtering device and from a rotation speed subjected to the past filtering processing stored in the second storing section,
   a determining device for determining whether there is rotation abnormality of the motor based on a result of comparison between a variation amount calculated by the calculation device and a preset threshold value, and
   a control device for controlling the motor in accordance with a result of the determination of the determining device, wherein
   the filtering device calculates and outputs an average value between the current rotation speed and a rotation speed detected before predetermined times thereof, as a rotation speed after the filtering processing.

3. A motor control apparatus according to claim 2, wherein
   the filtering device once or more carries out processing for calculating and outputting a rotation speed after two or more filtering processing from a rotation speed after current filtering processing and from a rotation speed after past filtering processing stored in the second storing section after a rotation speed after the filtering processing is calculated,
   the calculation device calculates a variation amount of a rotation speed from a rotation speed after one or more current filtering processing which was finally calculated by the filtering device and from a rotation speed after two or more past filtering processing stored in the second storing section.

4. A motor control apparatus comprising
   a detection device for detecting a rotation speed of a motor,
   a first storing section for successively storing the rotation speed detected by the detection device,
   a filtering device for removing a disturbance from a current rotation speed output from the detection device and from a past rotation speed stored in the first storing section,
   a second storing section for storing the rotation speed subjected to filtering processing and output from the filtering device,
   a calculation device for calculating a variation amount of a rotation speed from the rotation speed subjected to the current filtering processing output from the filtering device and from a rotation speed subjected to the past filtering processing stored in the second storing section,
   a determining device for determining whether there is rotation abnormality of the motor based on a result of comparison between a variation amount calculated by the calculation device and a preset threshold value, and
   a control device for controlling the motor in accordance with a result of the determination of the determining device, wherein
   the filtering device subtracts an average value of rotation speeds from a sum of the current rotation speed and a rotation speed detected before predetermined times thereof, and outputs the same as a rotation speed after the filtering processing.

5. A motor control apparatus according to claim 4, wherein the filtering device calculates the average value from the past rotation speed which does not includes the current rotation speed.

6. A motor control apparatus according to claim 5, wherein the filtering device once or more carries out processing for calculating and outputting a rotation speed after two or more filtering processing from a rotation speed after current filtering processing and from a rotation speed after past filtering processing stored in the second storing section after a rotation speed after the filtering processing is calculated, the calculation device calculates a variation amount of a rotation speed from a rotation speed after one or more current filtering processing which was finally calculated by the filtering device and from a rotation speed after two or more past filtering processing stored in the second storing section.

7. A motor control apparatus according to claim 4, wherein the filtering device once or more carries out processing for calculating and outputting a rotation speed after two or more filtering processing from a rotation speed after current filtering processing and from a rotation speed after past filtering processing stored in the second storing section after a rotation speed after the filtering processing is calculated, the calculation device calculates a variation amount of a rotation speed from a rotation speed after one or more current filtering processing which was finally calculated by the filtering device and from a rotation speed after two or more past filtering processing stored in the second storing section.

* * * * *